(12) United States Patent
Cimatti

(10) Patent No.: US 8,408,372 B2
(45) Date of Patent: Apr. 2, 2013

(54) MULTIDISK OIL-BATH CLUTCH

(75) Inventor: Franco Cimatti, Pavullo (IT)

(73) Assignee: Ferrari S.p.A., Modena (IT)

( * ) Notice: Subject to any disclaimer, the term of this patent is extended or adjusted under 35 U.S.C. 154(b) by 628 days.

(21) Appl. No.: 12/559,464

(22) Filed: Sep. 14, 2009

(65) Prior Publication Data
US 2010/0072020 A1    Mar. 25, 2010

(30) Foreign Application Priority Data
Sep. 12, 2008    (IT) .............................. BO2008A0562

(51) Int. Cl.
*F16D 13/72*    (2006.01)
(52) U.S. Cl. ............ 192/70.12; 192/113.35; 192/113.36
(58) Field of Classification Search ............... 192/85.61, 192/113.34–113.36
See application file for complete search history.

(56) References Cited

U.S. PATENT DOCUMENTS

| | | | |
|---|---|---|---|
| 2,775,328 A * | 12/1956 | Yokel | 192/57 |
| 3,202,253 A * | 8/1965 | Merritt et al. | 192/113.36 |
| 3,823,802 A | 7/1974 | Winzeler et al. | |
| 4,828,089 A * | 5/1989 | Collins et al. | 192/70.12 |
| 5,094,331 A | 3/1992 | Fujimoto et al. | |
| 5,240,095 A * | 8/1993 | Shimamura et al. | 192/70.12 |
| 5,261,517 A | 11/1993 | Hering | |
| 6,135,256 A * | 10/2000 | Han et al. | 192/70.12 |
| 2008/0073171 A1 * | 3/2008 | Mordukhovich et al. | 192/113.34 |
| 2011/0000757 A1 | 1/2011 | Muizelaar et al. | |

FOREIGN PATENT DOCUMENTS

| | | |
|---|---|---|
| EP | 0115211 | 8/1984 |
| EP | 0848176 | 6/1998 |
| EP | 0848179 | 6/1998 |
| WO | 2004/013508 | 2/2004 |

OTHER PUBLICATIONS

Search Report for Italian Patent Application No. BO2008000562; May 15, 2009.

* cited by examiner

*Primary Examiner* — Richard M. Lorence
(74) *Attorney, Agent, or Firm* — Graybeal Jackson LLP; Kevin D. Jablonski

(57) ABSTRACT

An embodiment of a multidisk oil-bath clutch having: a housing mounted to rotate about a longitudinal axis of rotation; at least one hub mounted to rotate about the longitudinal axis of rotation and housed inside and coaxially with the housing; a number of drive disks housed inside the housing and angularly integral with the housing or the hub; a number of driven disks housed inside the housing, alternating with the drive disks, and angularly integral with the hub or the housing; at least one oil inlet into the housing; and at least one oil outlet from the housing. Each drive disk has a number of first circulation channels equally spaced about the longitudinal axis of rotation and extending radially from an inner edge of the drive disk to an outer edge of the drive disk; and each driven disk has a number of second circulation channels equally spaced about the longitudinal axis of rotation and extending radially from an inner edge of the driven disk to an outer edge of the driven disk.

6 Claims, 49 Drawing Sheets

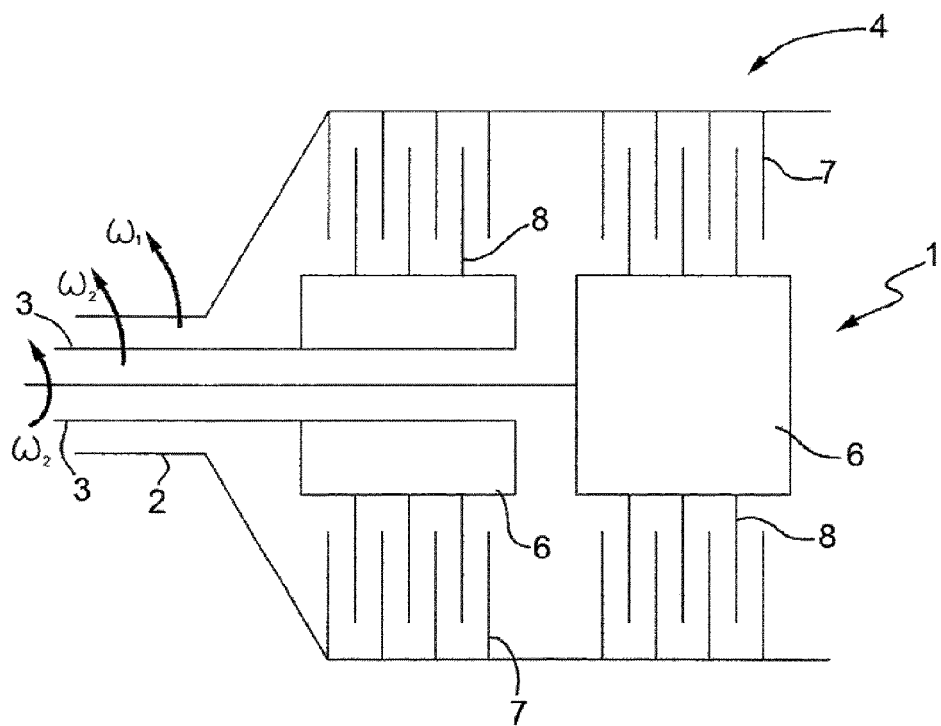
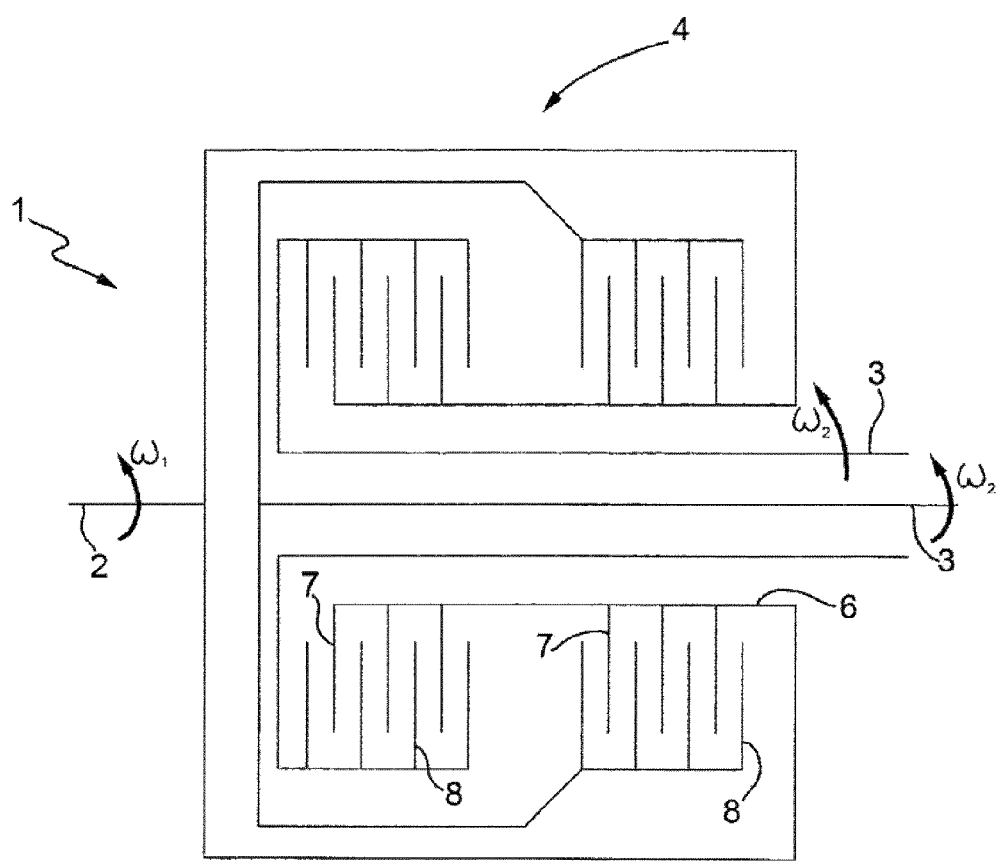
FIG.46

MULTIDISK OIL-BATH CLUTCH

PRIORITY CLAIM

The instant application claims priority to Italian Patent Application No. BO2008A000562, entitled MULTIDISK OIL-BATH CLUTCH, filed Sep. 12, 2008, which application is incorporated herein by reference in its entirety.

TECHNICAL FIELD

An embodiment of the present invention relates to a multidisk oil-bath clutch.

BACKGROUND

A multidisk oil-bath clutch comprises a cylindrical housing that houses a number of drive disks alternating with a corresponding number of driven disks; the lateral surfaces of the drive disks are covered on both sides with friction material, while the lateral surfaces of the driven disks are smooth; or only one side of the lateral surface of both the drive and driven disks is covered with friction material. In an externally driven clutch, the drive disks are angularly integral with the cylindrical housing, while the driven disks are integral with a central hub extending outwards of the cylindrical housing on one side; and vice versa in the case of an internally driven clutch, i.e., the driven disks are angularly integral with the cylindrical housing, and the drive disk are integral with the central hub.

Pressurized oil is fed constantly into the housing, and substantially serves to cool the disks and lubricate the rotating parts. The oil is normally fed axially through at least one inlet opening at a first end of the disk pack, and is extracted axially through at least one outlet opening at a second end, opposite the first end, of the disk pack.

The performance of a multidisk oil-bath clutch—i.e., the maximum torque that can be transmitted, and the ability to operate with slippage between the drive and driven disks (to adapt speed) for a prolonged period of time—depends on the maximum amount of overheating to which the disks are subjected (over and above a given temperature, the friction material deteriorates, and the disk metal may undergo deformation). To improve performance of a multidisk oil-bath clutch, the amount of heat generated is reduced and/or the cooling is improved. To reduce the amount of heat generated, for a given friction material, the contact surface area between the drive and driven disks (i.e., the number and/or size of the disks) is increased. This solution, however, may result in an increase in the size (axial and/or radial) and weight of the clutch. To improve cooling, it has been proposed to increase oil flow to the clutch. This, however, calls for a larger (and therefore heavier) oil supply circuit, which may still pose serious limitations in that, for a given circuit size, an increase in oil flow to the clutch may mean a corresponding increase in oil feed pressure.

International Patent Application Publication No. WO 2004/013508, which is incorporated herein by reference, describes a multidisk oil-bath clutch comprising: a housing mounted for rotation about a longitudinal axis of rotation; a hub mounted for rotation about the longitudinal axis of rotation and housed inside and coaxially with the housing; a number of drive disks housed inside the housing and angularly integral with the housing or hub; a number of driven disks housed inside the housing, alternating with the drive disks, and angularly integral with the hub or housing; at least one oil inlet into the housing; and at least one oil outlet from the housing. Each drive disk has a number of first circulation channels equally spaced about the longitudinal axis of rotation and extending radially from an inner edge of the drive disk to an outer edge of the drive disk; and each driven disk has a number of second circulation channels equally spaced about the longitudinal axis of rotation and extending radially from an inner edge of the driven disk to an outer edge of the driven disk.

SUMMARY

An embodiment of the present invention is a multidisk oil-bath clutch designed to eliminate the above drawbacks while at the same time being cheap and easy to produce, and which, in particular, provides for high performance and compactness.

BRIEF DESCRIPTION OF THE DRAWINGS

At least one non-limiting embodiment of the present invention will be described by way of example with reference to the accompanying drawings, in which:

FIG. 46 shows schematic views of two double-clutch variations of the FIG. 1 clutch;

DETAILED DESCRIPTION

Figure 1:
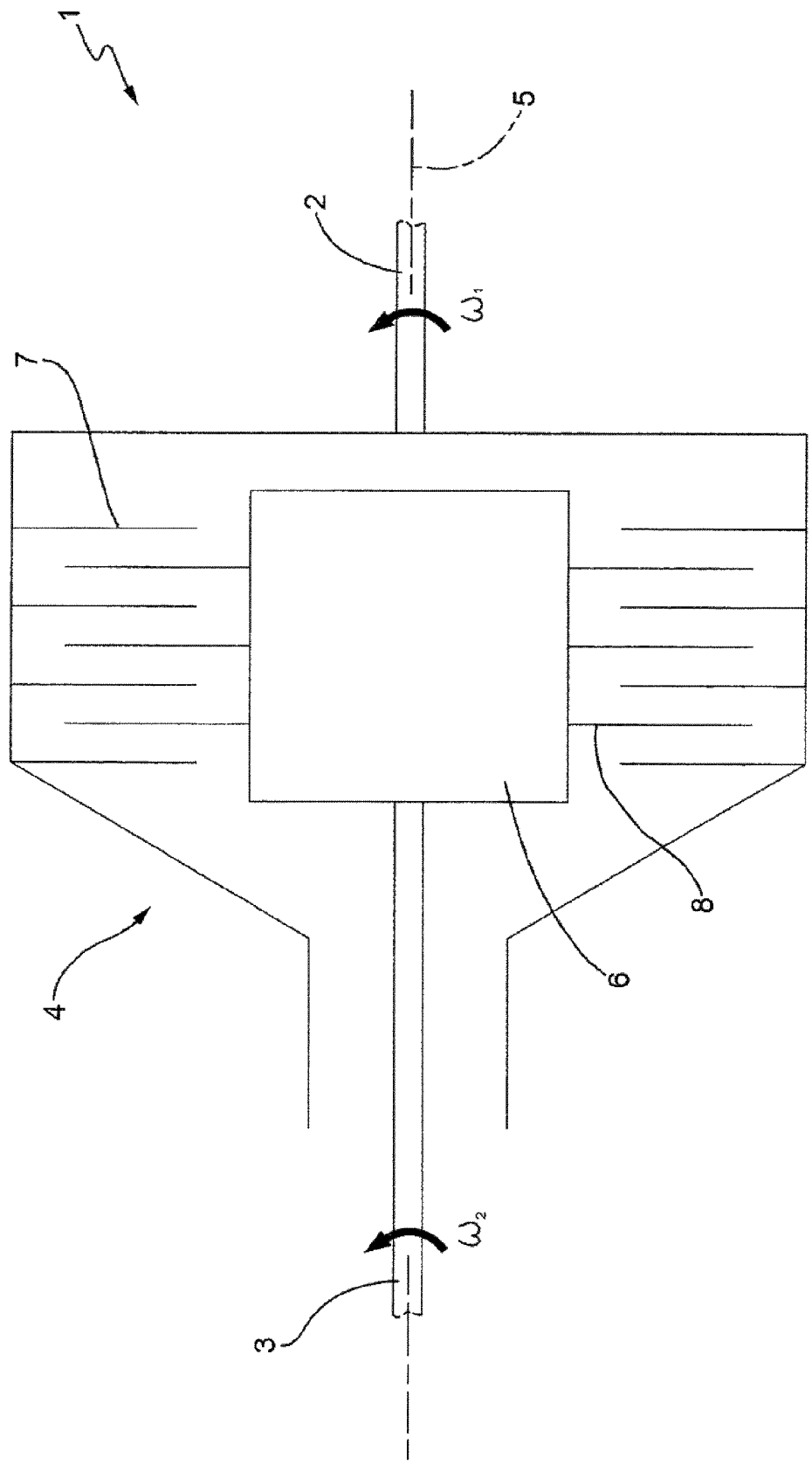
FIG. 1 shows a schematic view of a multidisk oil-bath clutch in accordance with an embodiment of the present invention.
Figure 2:
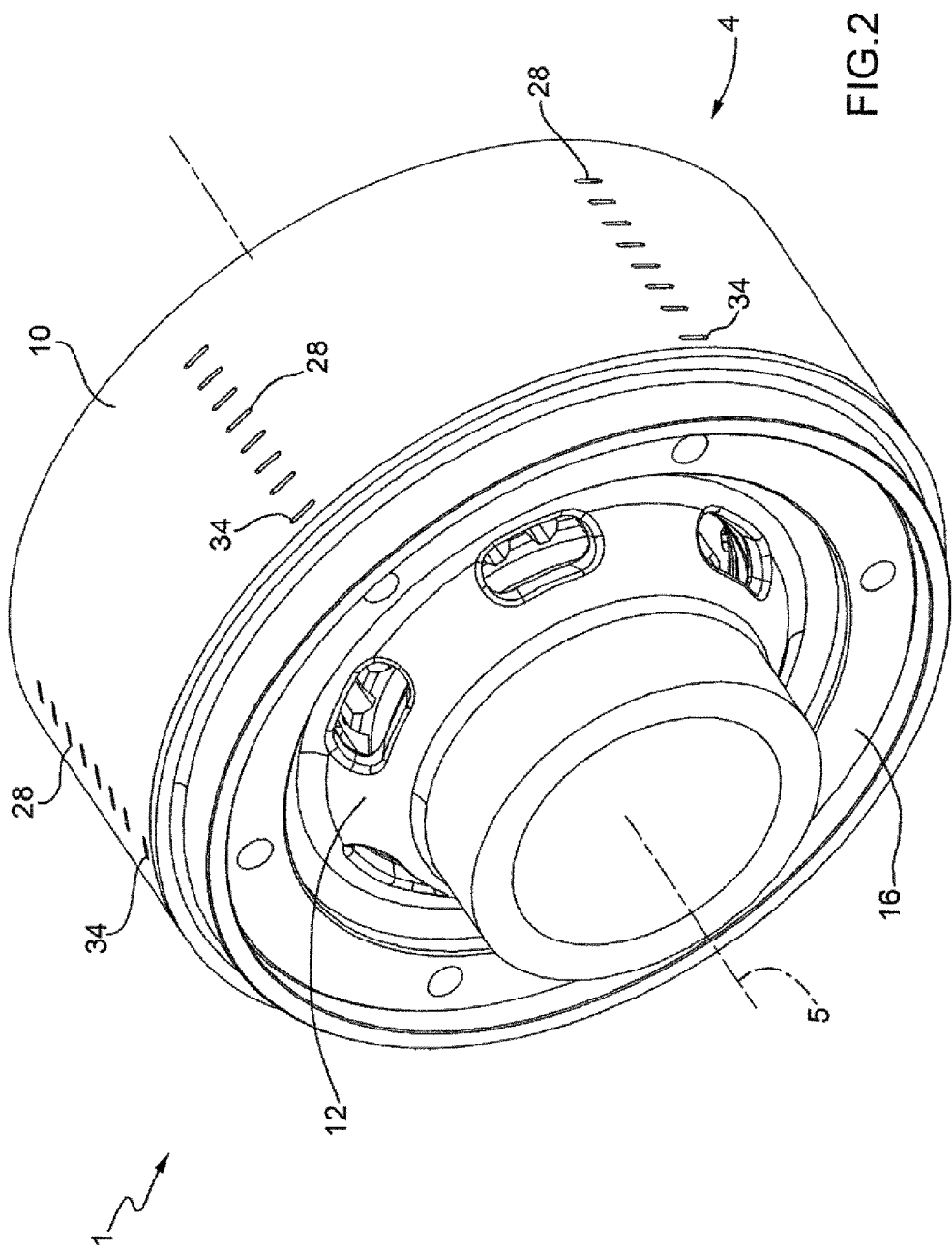
FIG. 2 shows a view in perspective of the FIG. 1 clutch.

Number 1 in FIG. 1 indicates as a whole a multidisk oil-bath clutch interposed between a drive (or input) shaft 2 rotating at an angular speed $\omega_1$, and a driven (or output) shaft 3 rotating at an angular speed $\omega_2$.

Clutch 1 comprises a housing 4 mounted for rotation about a longitudinal axis of rotation 5 and angularly integral with drive shaft 2; and a hub 6 mounted for rotation about a longitudinal axis of rotation 5, housed inside and coaxially with housing 4, and angularly integral with driven shaft 3.

Housing 4 houses a pack of disks comprising a number of drive disks 7 angularly integral with housing 4, and a number of driven disks 8 alternating with drive disks 7 and angularly integral with hub 6.

As shown in FIGS. 2-12, each drive disk 7 is made angularly integral with housing 4 by a number of external radial teeth 9, which engage corresponding slots formed through a lateral shell 10 of housing 4. And each driven disk 8 is made angularly integral with hub 6 by a number of internal radial teeth 11, which engage corresponding slots formed through the lateral surface of hub 6.

The pack of disks 7 and 8 is packed between a cover 12 of housing 4, and a retaining disk 13 angularly integral with housing 4 and on the opposite side of cover 12. Retaining disk 13 is made angularly integral with housing 4 by a number of external radial teeth 14, which engage corresponding slots formed through lateral shell 10 of housing 4. Observe that the pack of disks 7 and 8 is packed between two members (cover 12 and retaining disk 13) angularly integral with housing 4, so, at the outer ends of the pack of disks 7 and 8, two drive disks 7 are angularly integral with housing 4, and so rotate synchronously (i.e., with no slide) with cover 12 and retaining disk 13. Retaining disk 13 is maintained in position by a retaining ring 15 located alongside retaining disk 13, on the opposite side of the pack of disks 7 and 8, and inserted inside an annular slot in lateral shell 10 of housing 4.

Clutch 1 has a disk-pusher ring 16, which is coaxial with housing 4, is located on the outside of housing 4, facing cover 12 of housing 4, and has a number of axial pushers 17 (i.e., parallel to longitudinal axis of rotation 5) which press on the pack of disks 7 and 8. In actual use, disk-pusher ring 16 is moved axially (i.e., parallel to longitudinal axis of rotation 5) to press on and pack disks 7 and 8 together to transmit torque from drive disks 7 to driven disks 8.

As shown in FIGS. 7-10, a number of circulation channels 19 are formed between each drive disk 7 and the driven disks 8 facing it, are equally spaced about longitudinal axis of rotation 5, and extend radially from an inner edge of drive disk 7 to an outer edge of drive disk 7. Both the lateral walls of each drive disk 7 have a covering 20 of friction material. In an embodiment, each circulation channel 19 is formed in the covering 20 of friction material covering the lateral surface of drive disk 7. For example, circulation channels 19 may be formed by applying slices/sectors of covering 20 of friction material spaced apart so that each circulation channel 19 is defined between two adjacent slices/sectors of covering 20 of friction material.

A number of circulation channels 21 are formed in each driven disk 8, are equally spaced about longitudinal axis of rotation 5, and extend radially from an inner edge of driven disk 8 to an outer edge of driven disk 8. In an embodiment, each circulation channel 21 extends between two opposite inner axial openings 22 (i.e., parallel to longitudinal axis of rotation 5) formed through the two lateral walls of driven disk 8, close to the inner edge of driven disk 8, and an outer radial opening 23 (i.e., perpendicular to longitudinal axis of rotation 5) formed through the outer edge of driven disk 8.

Pressurized oil is fed through housing 4 from a main inlet 24 to a main outlet 25, and substantially serves to cool disks 7 and 8 and lubricate the rotating component parts. Main inlet 24 is located axially (i.e., parallel to longitudinal axis of rotation 5) at a first end of housing 4, and main outlet 25 is located axially (i.e., parallel to longitudinal axis of rotation 5) at a second end, opposite the first end, of housing 4. In the FIG. 2-12 embodiment, main inlet 24 is defined by an annular passage extending about a first end of hub 6, and main outlet 25 is defined by a number of elongated through holes equally spaced about longitudinal axis of rotation 5, formed through cover 12 of housing 4, and extending about a second end, opposite the first end, of hub 6.

In an embodiment, a feed conduit 26 is formed through hub 6, is located centrally and axially (i.e., parallel to longitudinal axis of rotation 5), and receives pressurized oil; and a number of secondary oil inlets 27 are formed radially (i.e., perpendicular to longitudinal axis of rotation 5) through a lateral surface of hub 6, and feed oil from feed conduit 26 into housing 4 and onto the pack of disks 7 and 8. In other words, pressurized oil is fed into housing 4 both axially through main inlet 24, and radially through secondary inlets 27.

In an embodiment, a number of secondary oil outlets 28 are formed through lateral shell 10 of housing 4, and extend radially (i.e., perpendicular to longitudinal axis of rotation 5) at disks 7 and 8. In other words, pressurized oil flows out of housing 4 both axially through main outlet 25, and radially through secondary outlets 28.

Figure 7:
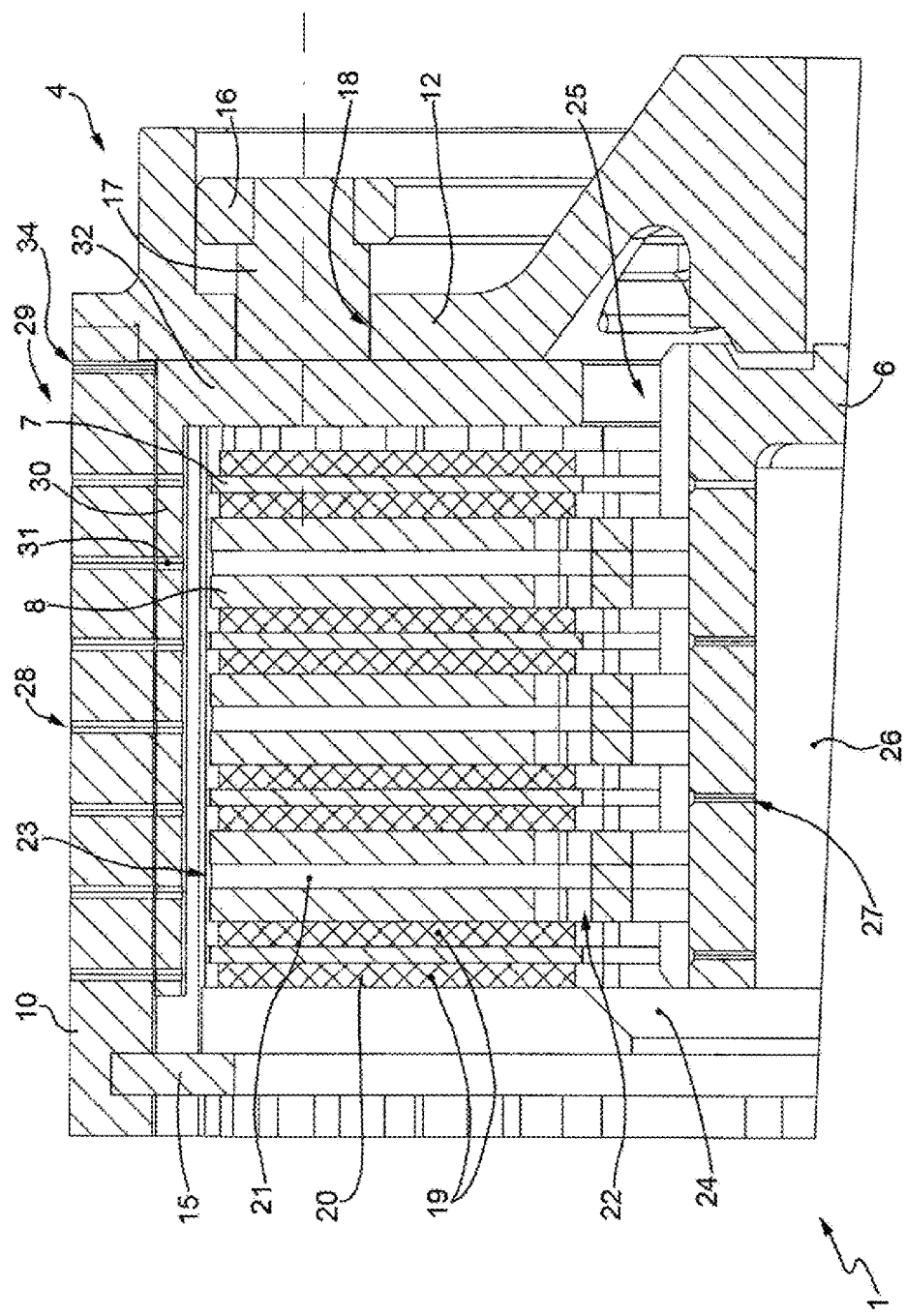
FIG. 7 shows an enlarged detail of FIG. 6 with the clutch released.
Figure 8:
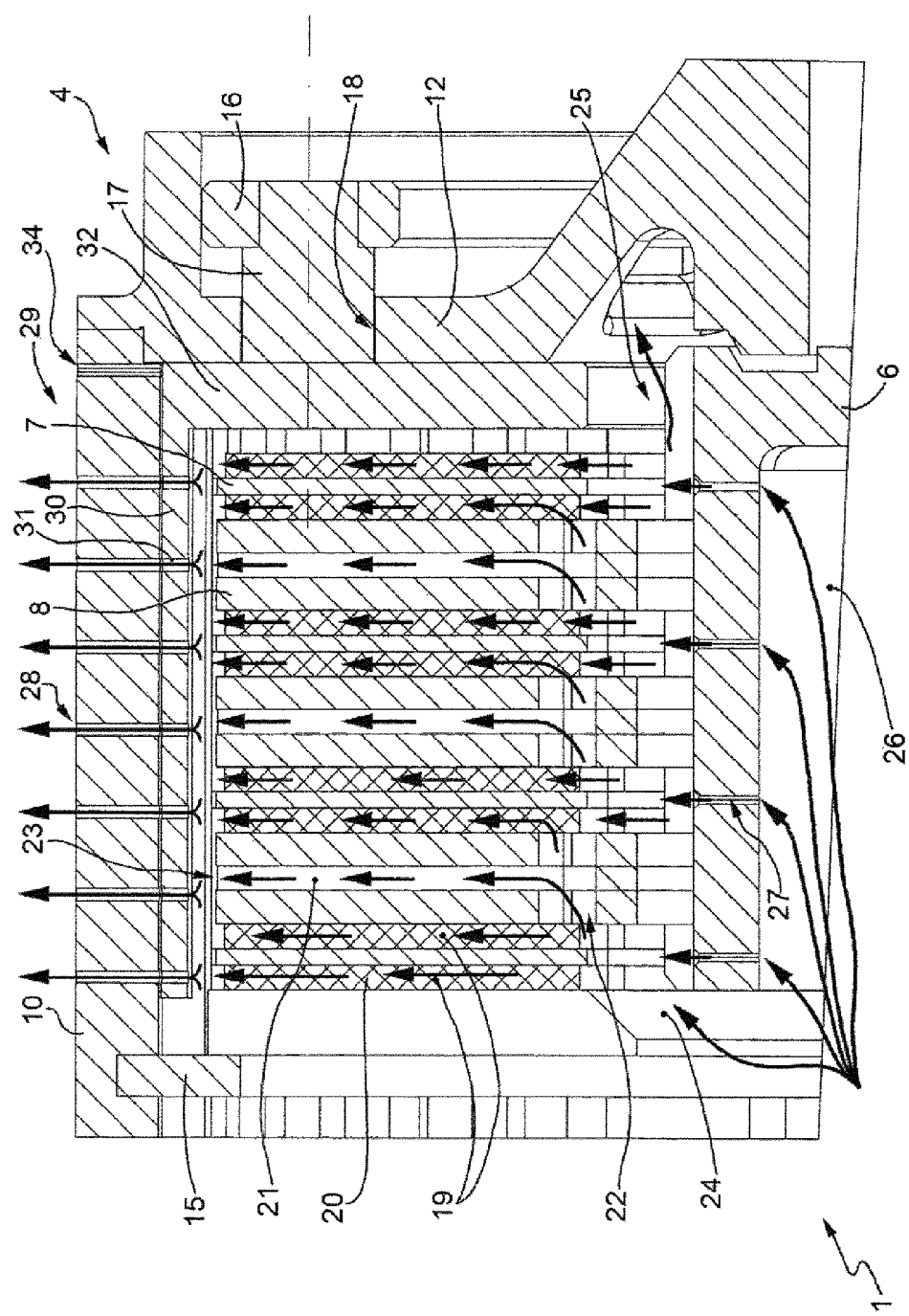
FIG. 8 shows an enlarged detail of FIG. 6, illustrating oil flow with the clutch released.
Figure 10:
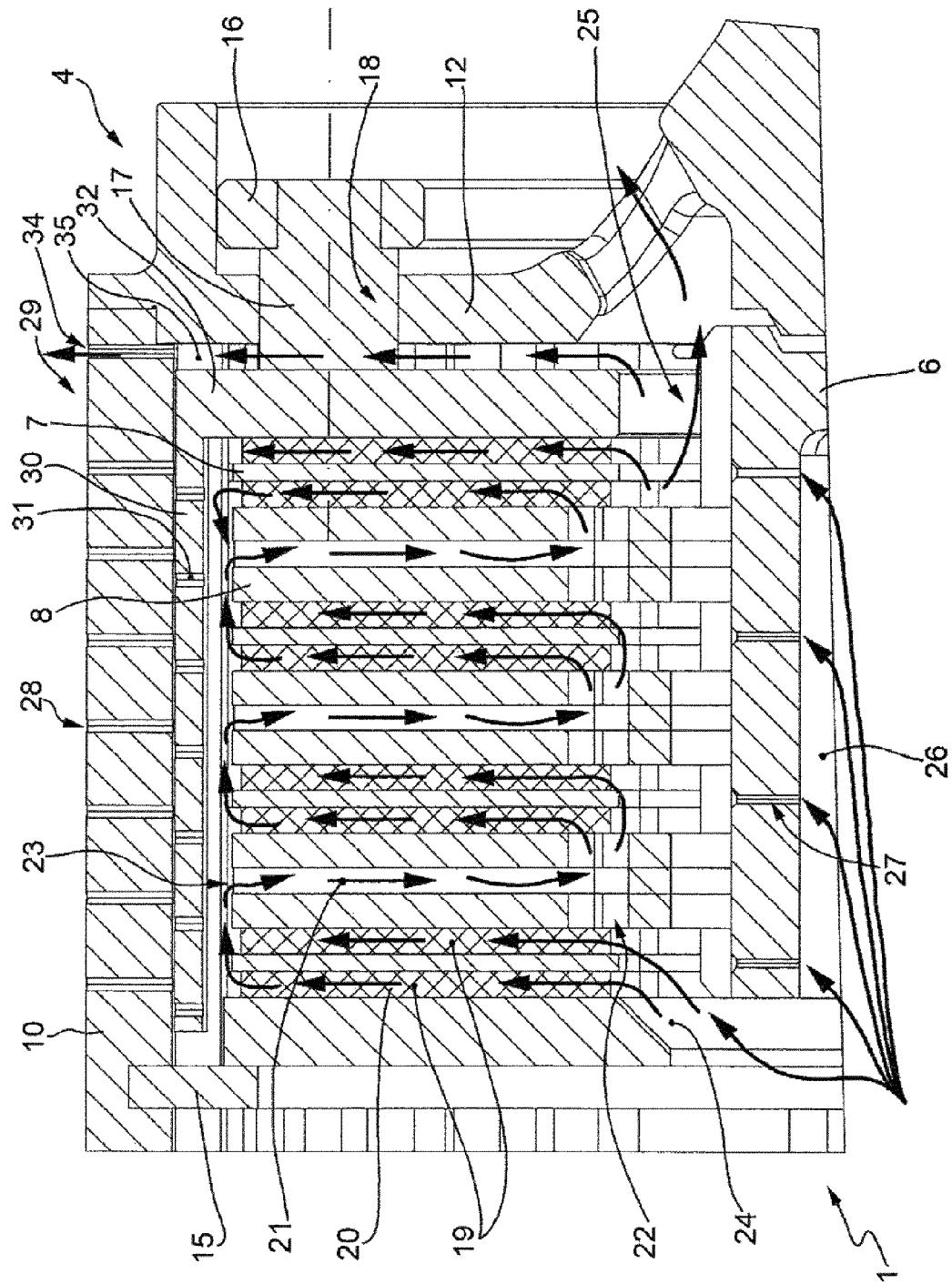
FIG. 10 shows an enlarged detail of FIG. 6, illustrating oil flow with the clutch engaged.
Figure 11:
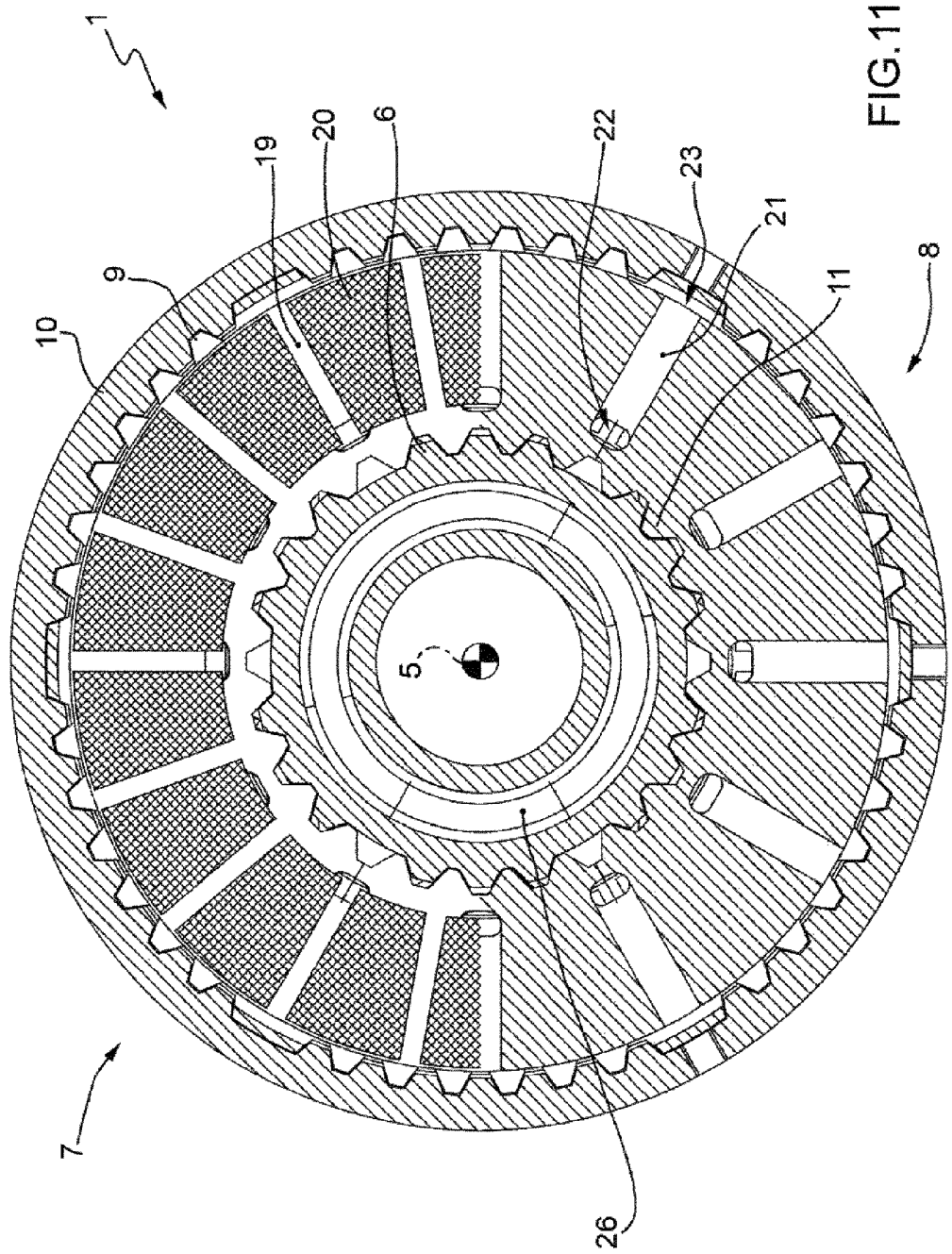
FIG. 11 shows a section along line XI-XI of the FIG. 1 clutch.
Figure 12:
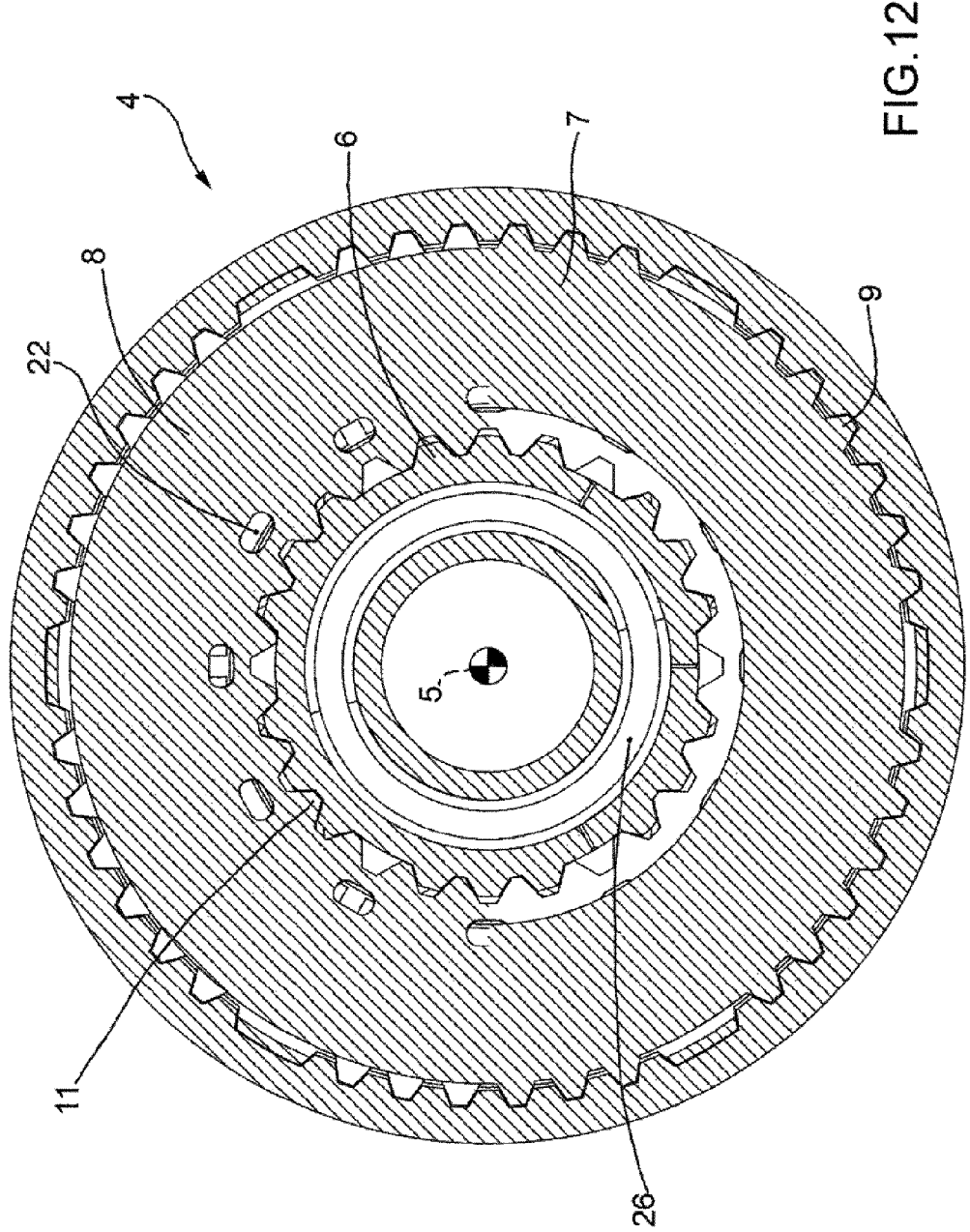
FIG. 12 shows a section along line XII-XII of the FIG. 1 clutch.

Clutch 1 comprises an on-off valve 29 fitted to secondary oil outlets 28 to cut off oil flow through secondary outlets 28 when clutch 1 is activated to transmit torque between drive disks 7 and driven disks 8 (as shown in FIGS. 10 and 11), and to permit oil flow through secondary outlets 28 when clutch 1 is released and no torque is transmitted between drive disks 7 and driven disks 8 (as shown in FIGS. 7 and 8).

Figure 3:
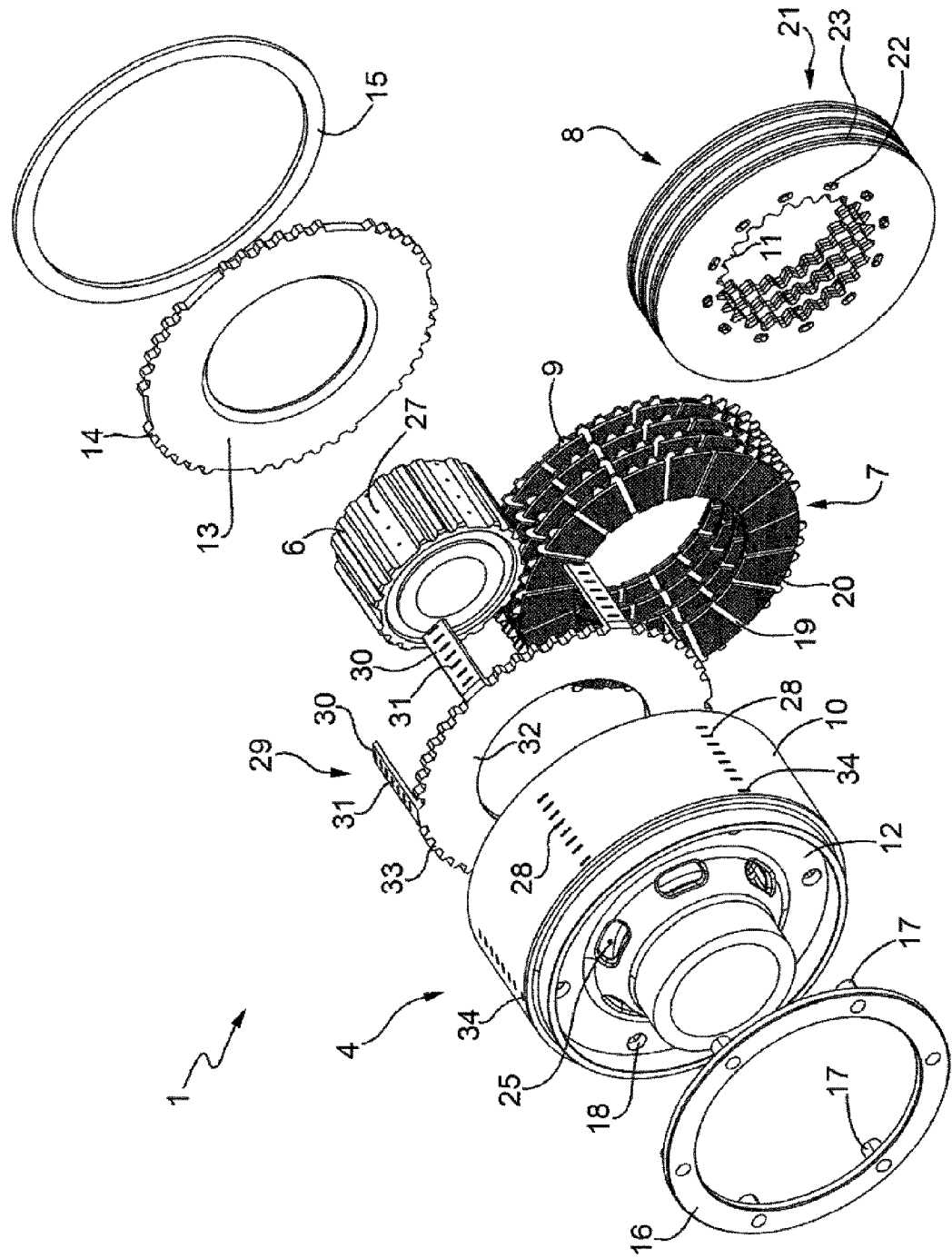
FIG. 3 shows an exploded view in perspective, with parts removed for clarity, of the FIG. 1 clutch.
Figure 4:
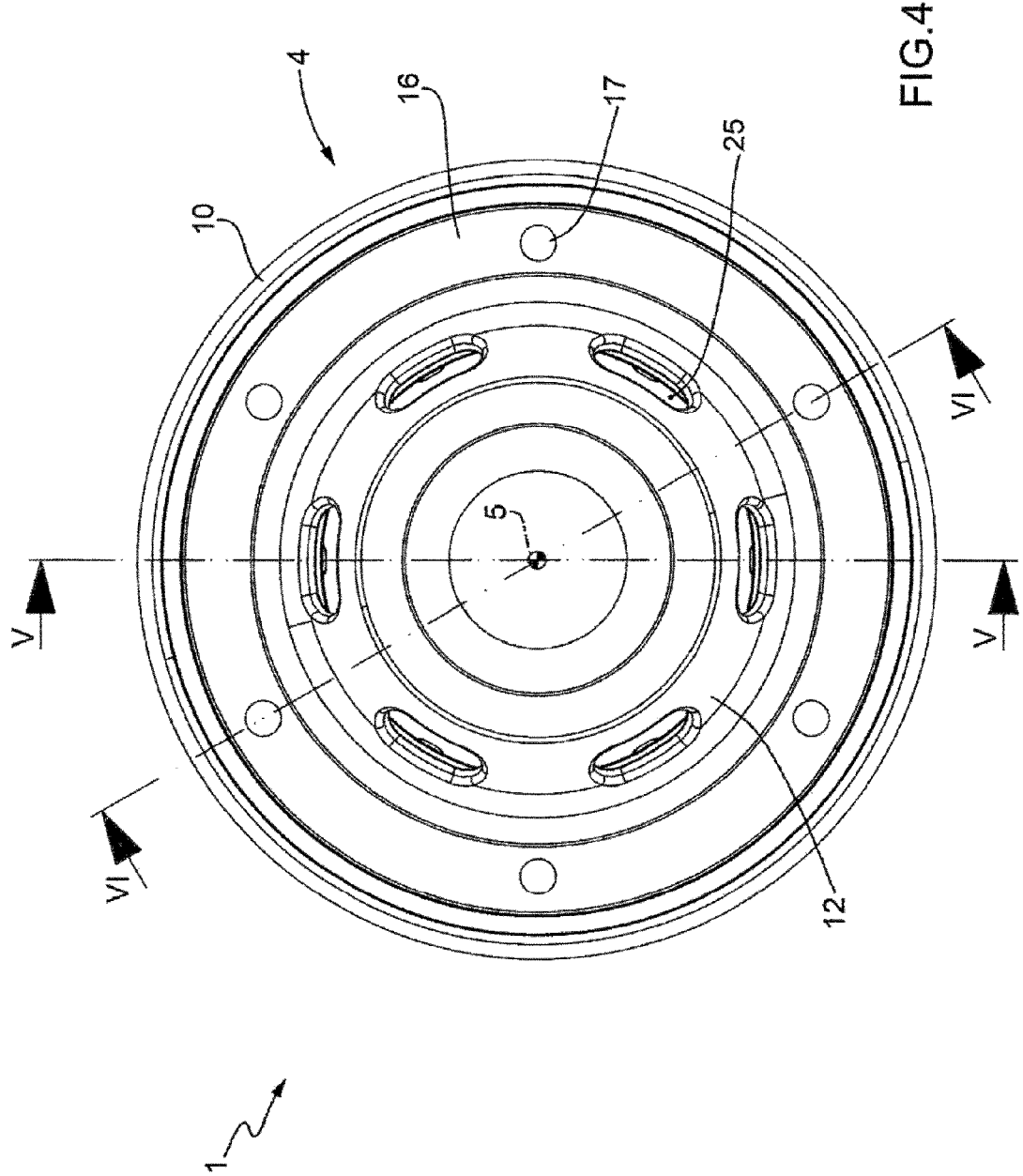
FIG. 4 shows a front view of the FIG. 1 clutch.
Figure 5:
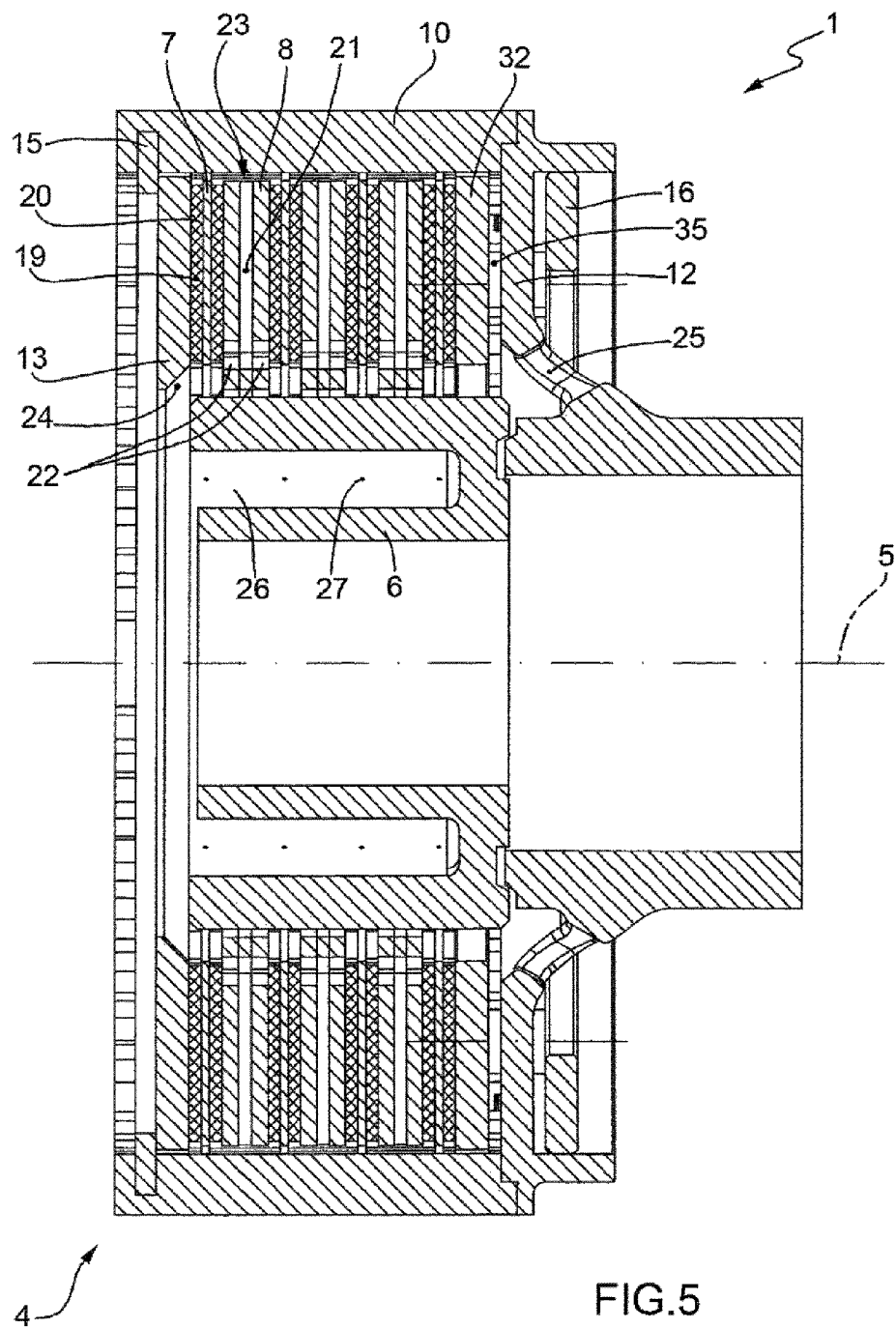
FIG. 5 shows a section along line V-V of the FIG. 1 clutch.
Figure 6:
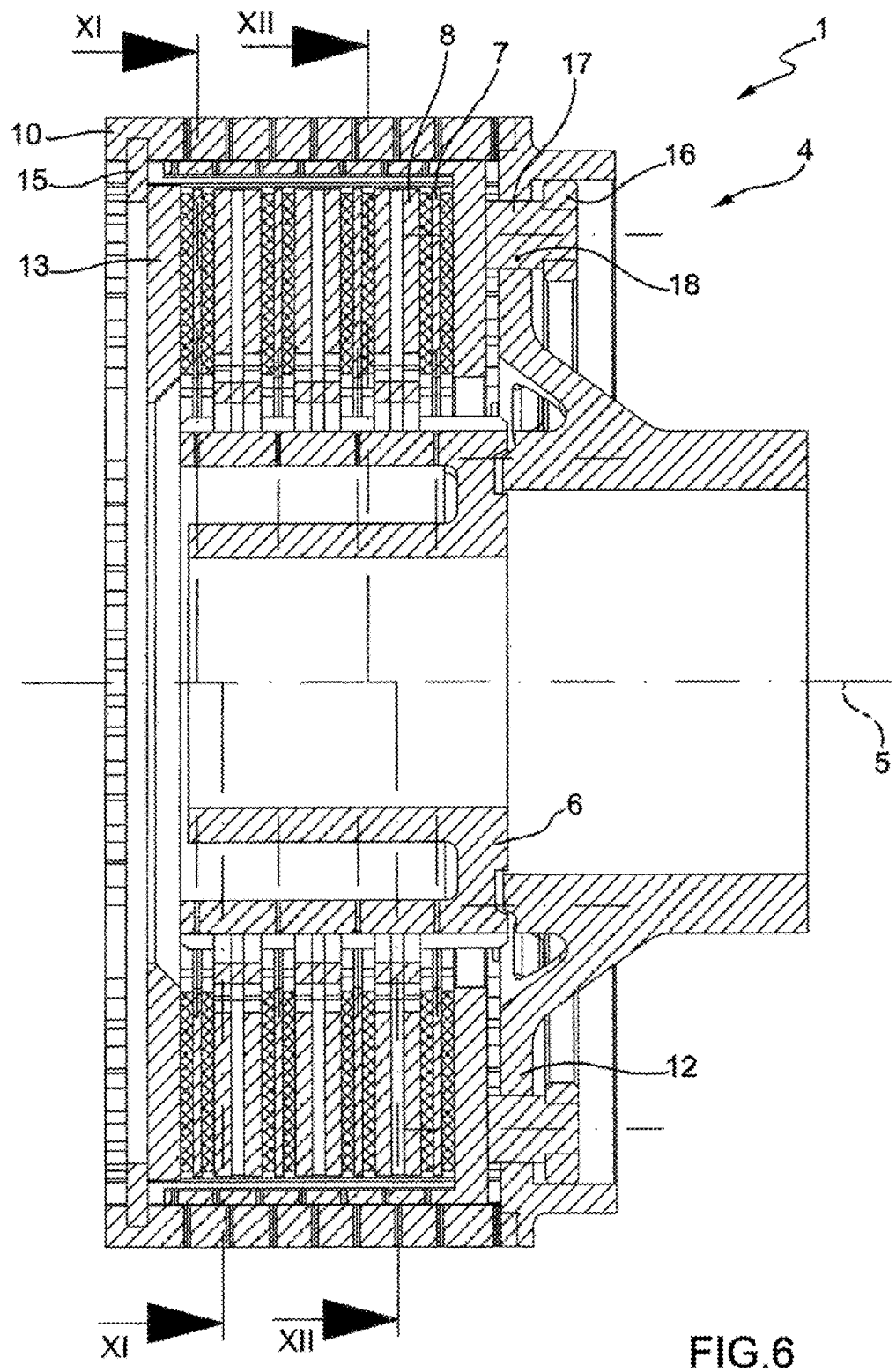
FIG. 6 shows a section along line VI-VI of the FIG. 1 clutch.

In an embodiment shown in FIG. 3, on-off valve 29 comprises a number of shutters 30, each of which is located inside housing 4, close to lateral shell 10 of housing 4, has a number of through holes 31 corresponding with respective secondary oil outlets 28, and is movable axially between an open position (FIGS. 7 and 8), in which each through hole 31 of shutter 30 is aligned with a respective secondary oil outlet 28, and a closed position (FIGS. 9 and 10), in which each through hole 31 of shutter 30 is offset with respect to a respective secondary oil outlet 28.

In an embodiment shown in FIGS. 7-10, on-off valve 29 is activated (i.e., moved between the open and closed positions) by disk-pusher ring 16, which is connected mechanically to shutters 30 to move shutters 30 axially. More specifically, shutters 30 are all elongated axially, and are supported by and project from a common supporting disk 32 interposed between cover 12 of housing 4 and the pack of disks 7 and 8, and, therefore, also between pushers 17 of disk-pusher ring 16 and the pack of disks 7 and 8. The common supporting disk 32 is made angularly integral with housing 4 by a number of external radial teeth 33 (FIG. 3) on supporting disk 32, which engage corresponding slots formed through lateral shell 10 of housing 4. As shown clearly in FIG. 3, to insert shutters 30, external teeth 9 on drive disks 7 and external teeth 14 on retaining disk 13 are missing at corresponding windows, in which to insert shutters 30.

A number of relief openings 34 are provided, are arranged in a circle close to cover 12 of housing 4, and are aligned with a gap 35 (FIGS. 9 and 10) formed between supporting disk 32 and cover 12 of housing 4 when disk-pusher ring 16 presses on supporting disk 32 and therefore on disks 7 and 8.

Operation of clutch 1 will now be described, with particular reference to FIGS. 7-10.

When clutch 1 is released (as shown in FIGS. 7 and 8)—i.e., when disk-pusher ring 16 exerts no pressure on disks 7 and 8, so no torque is transmitted between drive disks 7 and driven disks 8—on-off valve 29, as stated, is in the open position allowing oil outflow from housing 4 also through secondary outlets 28. As shown in FIG. 8, when clutch 1 is released, oil flows into housing 4 both axially through main inlet 24, and radially through secondary inlets 27, and flows out of housing 4 both axially through main outlet 25, and radially through secondary outlets 28. More specifically, the centrifugal (i.e., centrifugal pumping) effect caused by rotation of drive disks 7 (not being driven by drive disks 7, driven disks 8 are normally motionless) tends to force the oil outwards through circulation channels 19 in drive disks 7 and, on reaching lateral shell 10 of housing 4, out of housing 4 through secondary outlets 28. As a result, when clutch 1 is released, most of the oil flows out of housing 4 through secondary outlets 28, and only a small part of the oil flows out of housing 4 through main outlet 25.

Splash losses caused by the oil spinning inside housing 4 when clutch 1 is released are thus minimized. In other words, oil spin inside housing 4 results in energy losses which are best minimized by getting the oil out of housing 4 as fast as possible. It is important to observe that, when clutch 1 is released, no heat is generated by rubbing (i.e., friction) between drive disks 7 and driven disks 8, so there is no need for effective heat exchange between disks 7 and 8 to cool disks 7 and 8.

Figure 9:
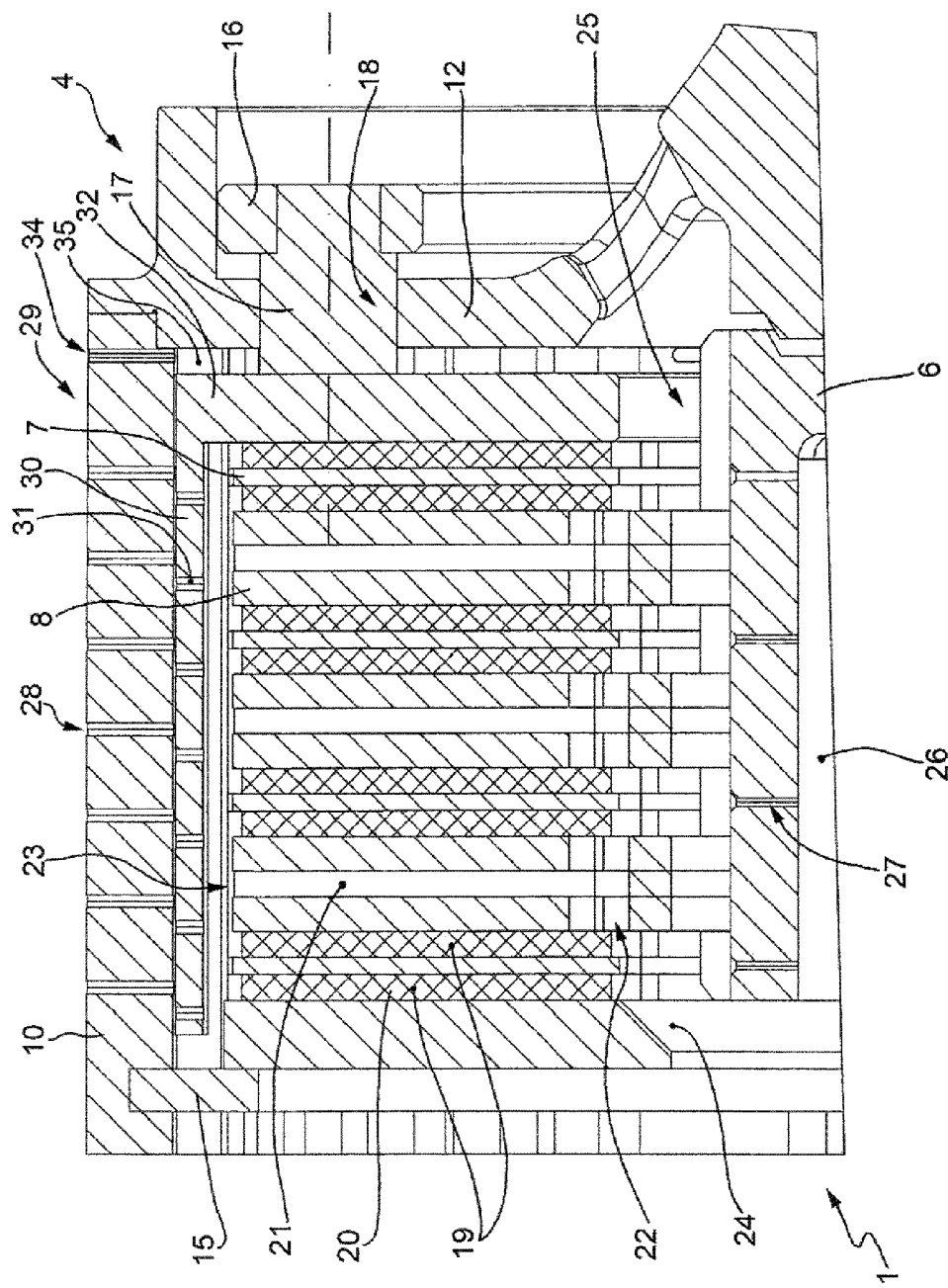
FIG. 9 shows an enlarged detail of FIG. 6 with the clutch engaged.

When clutch 1 is engaged (as shown in FIGS. 9 and 10)—i.e., when disk-pusher ring 16 exerts pressure on disks 7 and 8, so torque is transmitted between drive disks 7 and driven disks 8—on-off valve 29, as stated, is in the closed position preventing oil outflow from housing 4 through secondary outlets 28. As shown in FIG. 10, when clutch 1 is engaged, oil flows into housing 4 both axially through main inlet 24, and radially through secondary inlets 27, and only flows out of housing 4 axially through main outlet 25, on account of secondary outlets 28 being closed by shutters 30 of on-off valve 29.

In this condition, two situations are possible. In a first, clutch 1 is engaged and slippage occurs between drive disks 7 and driven disks 8 (i.e., drive disks 7 rotate faster than driven disks 8). This situation may be the more serious of the two for clutch 1, in that rubbing of drive disks 7 against driven disks 8 produces heat by friction, which is removed by the oil. In the second situation, clutch 1 is engaged and no slippage occurs between drive disks 7 and driven disks 8 (i.e., drive disks 7 rotate synchronously with driven disks 8). This situation may be the less serious of the two for clutch 1, in that no rubbing of drive disks 7 against driven disks 8 occurs, thus producing no heat by friction.

When clutch 1 is engaged, with no slippage between drive disks 7 and driven disks 8 (i.e., drive disks 7 rotate synchronously with driven disks 8), the centrifugal (i.e., centrifugal pumping) effect caused by rotation of disks 7 and 8 tends to force the oil outwards through circulation channels 19 in drive disks 7 and circulation channels 21 in driven disks 8. Not finding any way out through lateral shell 10 of housing 4, the oil close to lateral shell 10 of housing 4 tends to increase its local pressure until it eventually reaches a point of equilibrium, at which the oil is also forced out of housing 4 through main outlet 25.

When clutch 1 is engaged and slippage occurs between drive disks 7 and driven disks 8, drive disks 7 rotate faster than driven disks 8, so the centrifugal pumping effect of drive disks 7 is greater than that of driven disks 8. As a result, the oil is forced outwards through circulation channels 19 in drive disks 7, and inwards through circulation channels 21 in driven disks 8, until it eventually flows out of housing 4 through main outlet 25. In other words, the difference in rotation speed of disks 7 and 8 causes the oil to circulate outwards through circulation channels 19 in drive disks 7, and inwards through circulation channels 21 in driven disks 8, thus producing very high local oil flow through disks 7 and 8 and, hence, a high degree of heat exchange between the oil and disks 7 and 8.

Theoretical analysis shows that, by virtue of circulating oil in circulation channels 19 and 21 when clutch 1 is engaged with slippage between drive disks 7 and driven disks 8, oil flow along circulation channels 19 and 21 may even be as much as roughly ten times the steady-operating oil flow through inlets 24 and 27 and, hence, through main outlet 25. In other words, circulating oil in circulation channels 19 and 21 enhances the effectiveness with which the oil removes heat from, and so cools, disks 7 and 8, so that, for a given external size and oil feed pressure, clutch 1 may be cooled and may perform much better than a similar conventional clutch 1.

Oil circulation in circulation channels 19 and 21 is intrinsically self-adaptive, in that, as slippage (i.e., the difference in speed between drive disks 7 and driven disks 8) increases, oil circulation in circulation channels 19 and 21 and, at the same time, the amount of heat generated by friction between disks 7 and 8, also increase. And similarly, as slippage (i.e., the difference in speed between drive disks 7 and driven disks 8) decreases, oil circulation in circulation channels 19 and 21 and, at the same time, the amount of heat generated by friction between disks 7 and 8, also decrease.

Oil circulation, as described above, in circulation channels 19 and 21 when clutch 1 is engaged, does not occur when clutch 1 is released, on account of secondary outlets 28 being open and releasing the oil accumulated beneath lateral shell 10 of housing 4.

Note the function of relief openings 34 formed close to cover 12 of housing 4, and which are aligned with the gap 35 (FIGS. 9 and 10) formed between supporting disk 32 and cover 12 of housing 4 when disk-pusher ring 16 exerts pressure on supporting disk 32 and, hence, on disks 7 and 8. When disk-pusher ring 16 ceases to exert pressure on disks 7 and 8, relief openings 34 allow supporting disk 32 to move smoothly back into contact with cover 12 of housing 4, by allowing the oil film between supporting disk 32 and cover 12 to escape through relief openings 34, and so prevent it from hindering the movement of supporting disk 32.

Figure 13:
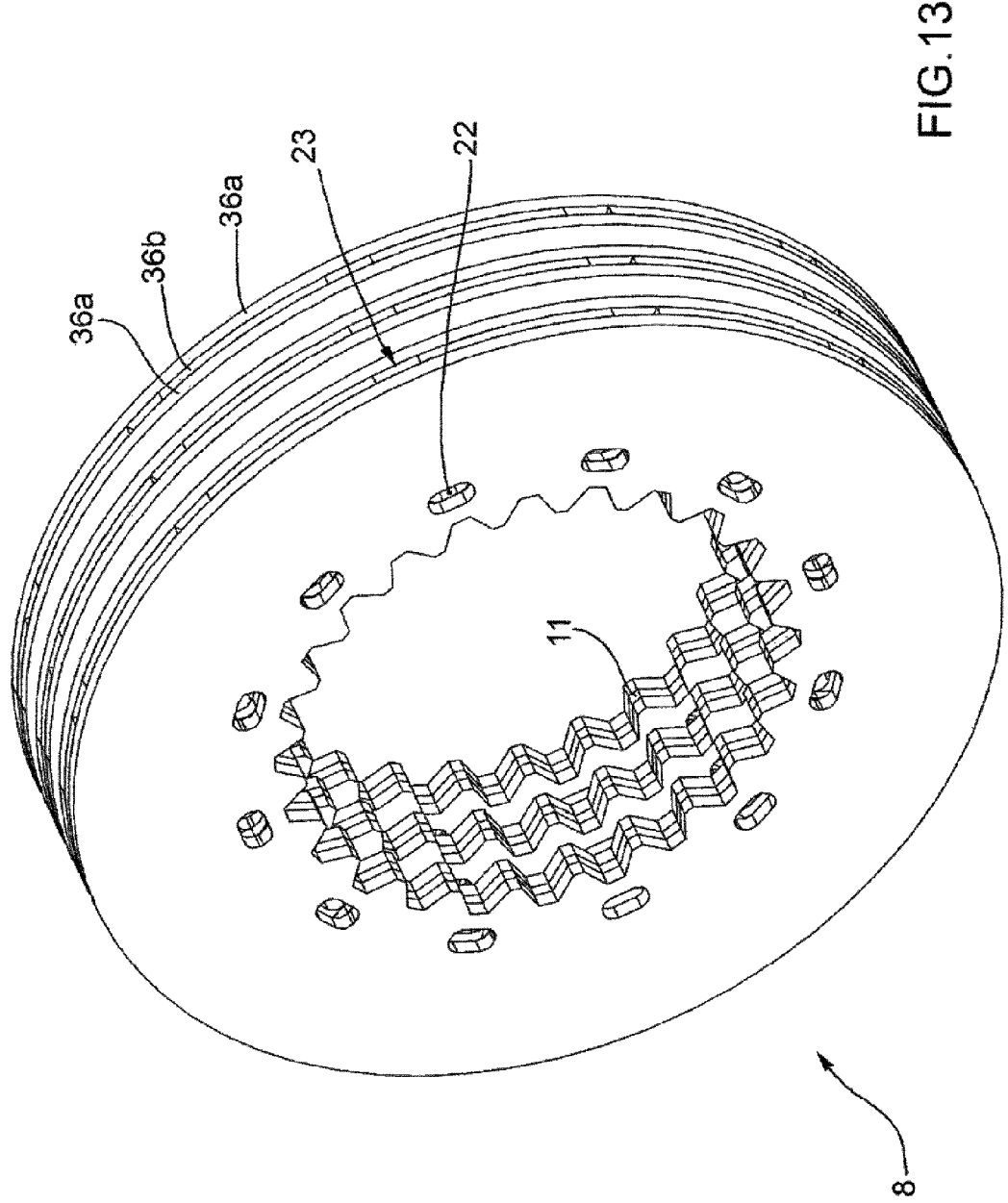
FIG. 13 shows a view in perspective of a driven-disk pack of the FIG. 1 clutch.
Figure 14:
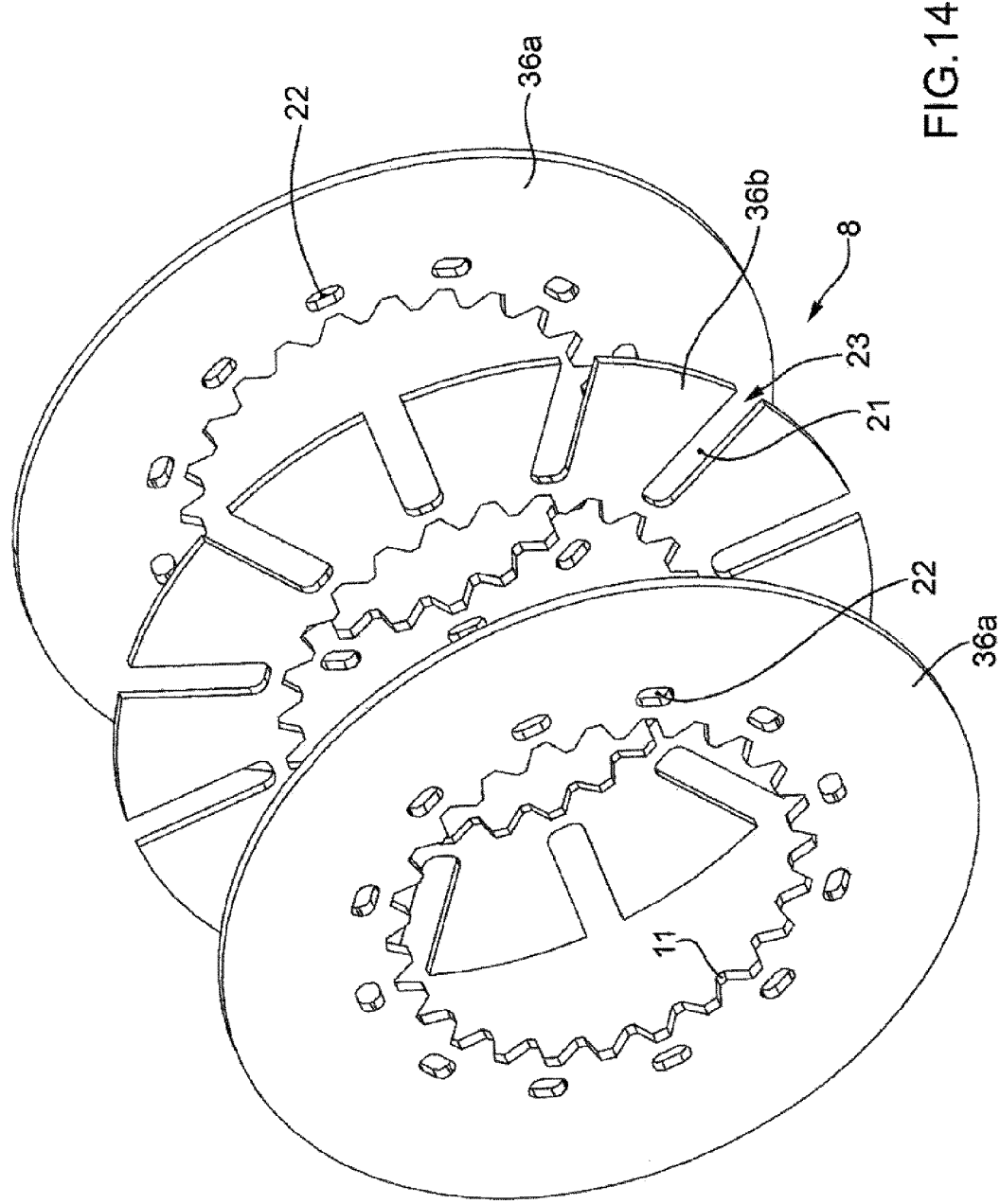
FIG. 14 shows an exploded view in perspective of the driven-disk pack in FIG. 13.
Figure 15:
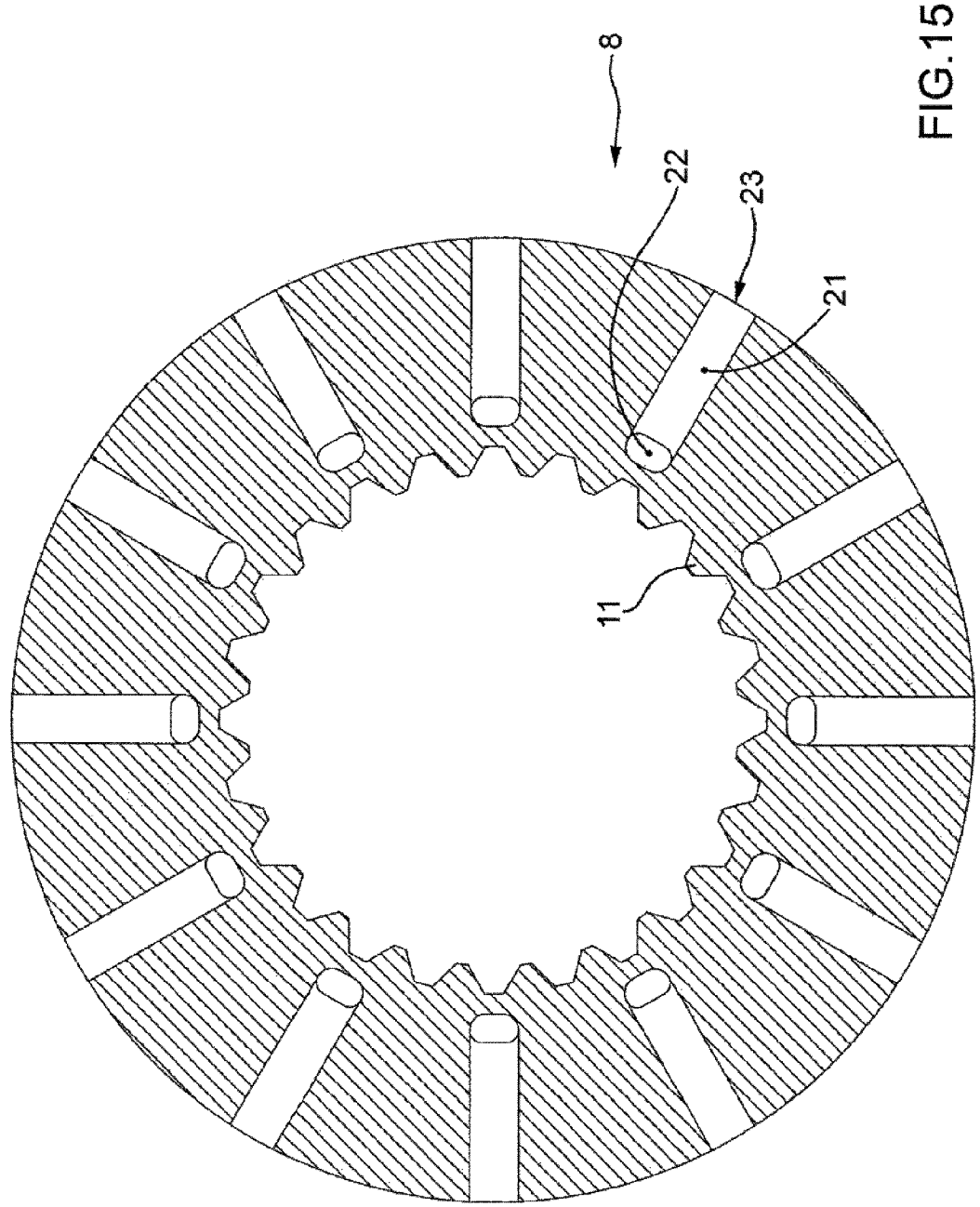
FIG. 15 shows a cross section of a driven disk in the FIG. 13 driven-disk pack.
Figure 18:
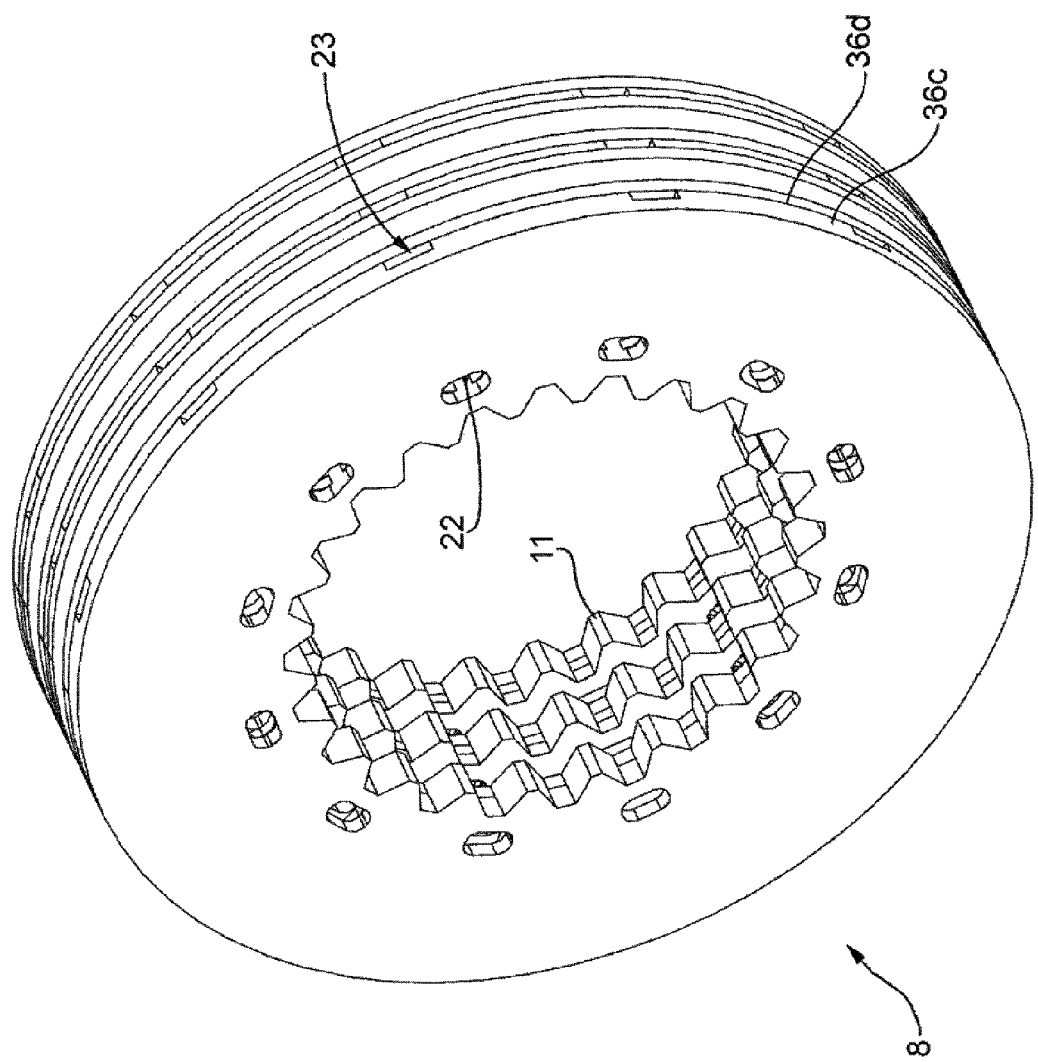
FIG. 18 shows a view in perspective of an alternative embodiment of the driven-disk pack of the FIG. 1 clutch.

As shown in FIGS. 13, 14 and 15, each driven disk 8 is formed by the union of three subdisks 36, and in particular two lateral subdisks 36a enclosing a central subdisk 36b. The three subdisks 36 of each driven disk 8 may be welded together. The two lateral subdisks 36a have the opposite inner axial openings 22 (i.e., parallel to longitudinal axis of rotation 5) of each circulation channel 21, and the central subdisk 36b has circulation channels 21 and corresponding outer radial openings 23. In the FIG. 18 embodiment, each driven disk 8 is formed by the union of two subdisks 36 that may be welded together. In each driven disk 8, one subdisk 36c has circulation channels 21 formed in the thickness of subdisk 36c itself, and the other subdisk 36d only has some of inner openings 22.

Figure 16:
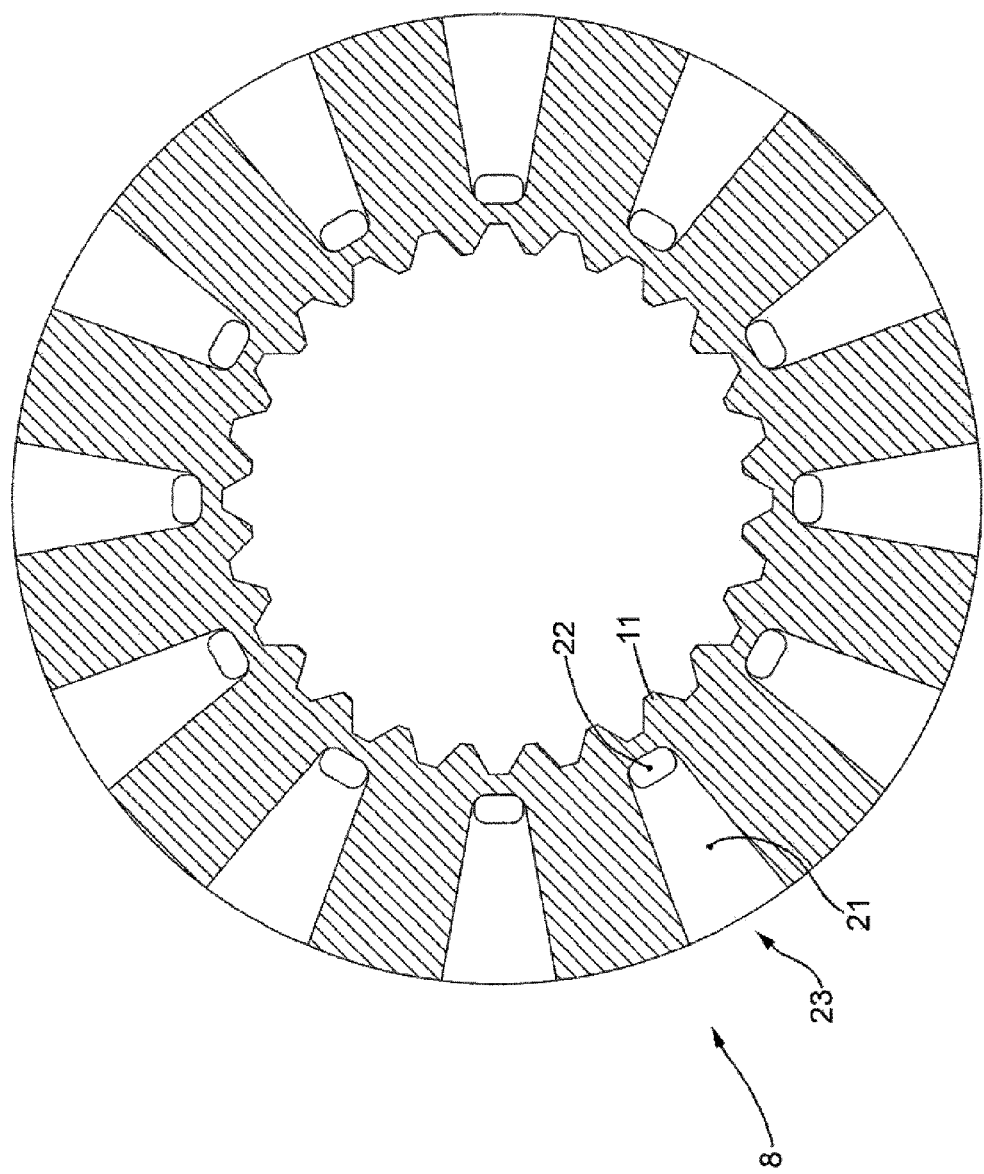
FIG. 16 shows a cross section of a variation of a driven disk in the FIG. 13 driven-disk pack.

In the FIG. 15 embodiment, each circulation channel 21 has a constant cross section. In the FIG. 16 embodiment, the cross section of each circulation channel 21 increases outwards (in a variation not shown, the cross section increases inwards, i.e., decreases outwards).

Figure 17:
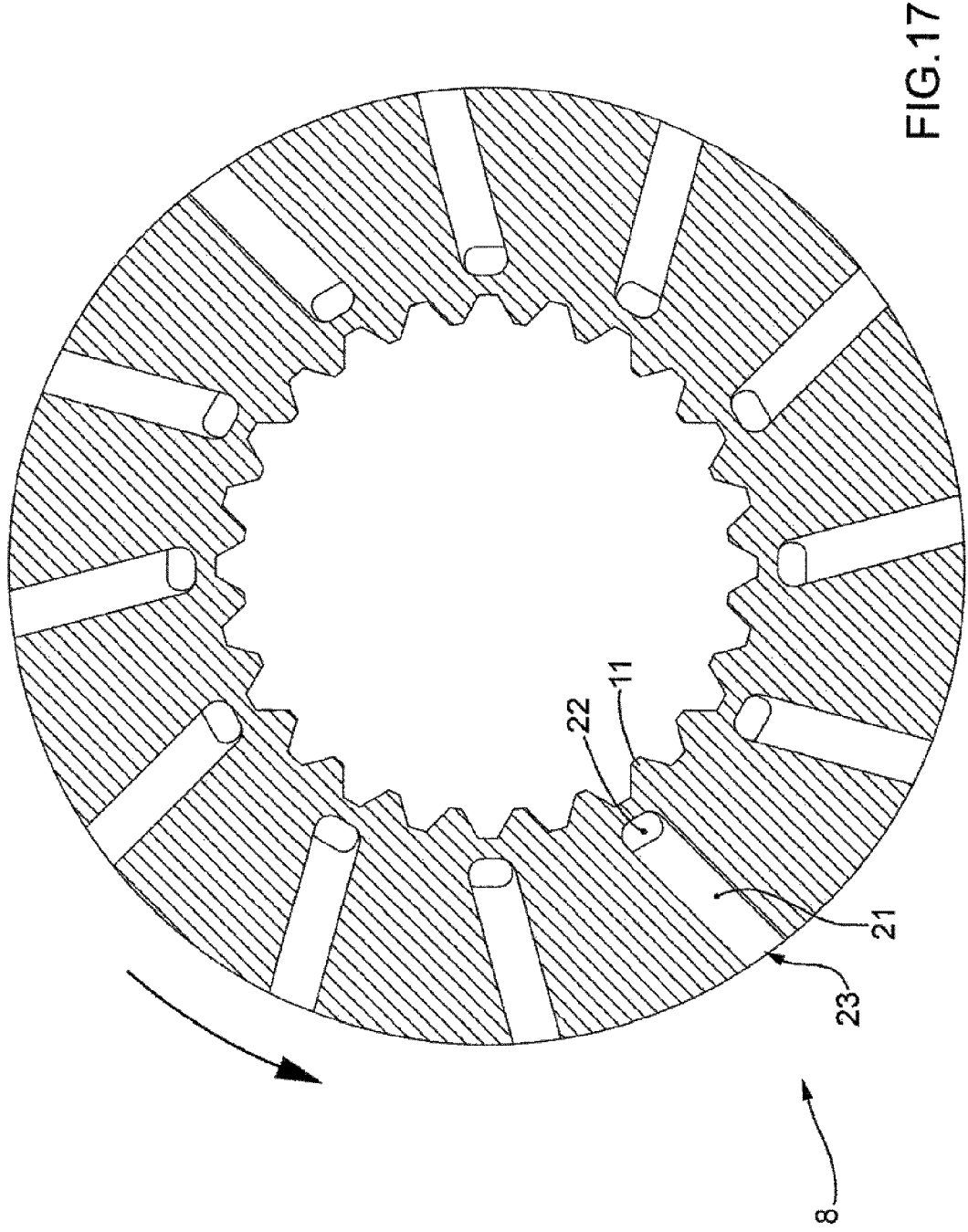
FIG. 17 shows a cross section of a further variation of a driven disk in the FIG. 13 driven-disk pack.

In the FIG. 15 embodiment, each circulation channel 21 is oriented radially (i.e., is coaxial with, i.e., slopes at a zero angle with respect to, a respective radius). In the FIG. 17 embodiment, each circulation channel 21 slopes with respect to the radial, and forms an obtuse angle with the rotation direction. This orientation of circulation channels 21 enhances the turbine effect produced inside circulation channels 21, and so, on the one hand, improves inward oil circulation along circulation channels 21, and, on the other, tends to rotate driven disks 8 hydraulically (in other words, centripetal oil flow generates a tangential component on driven disks 8, which produces the turbine effect).

In an embodiment not shown, driven disks 8 have axial through holes (i.e., parallel to longitudinal axis of rotation 5) which may be located at or between circulation channels 21.

Figure 19:
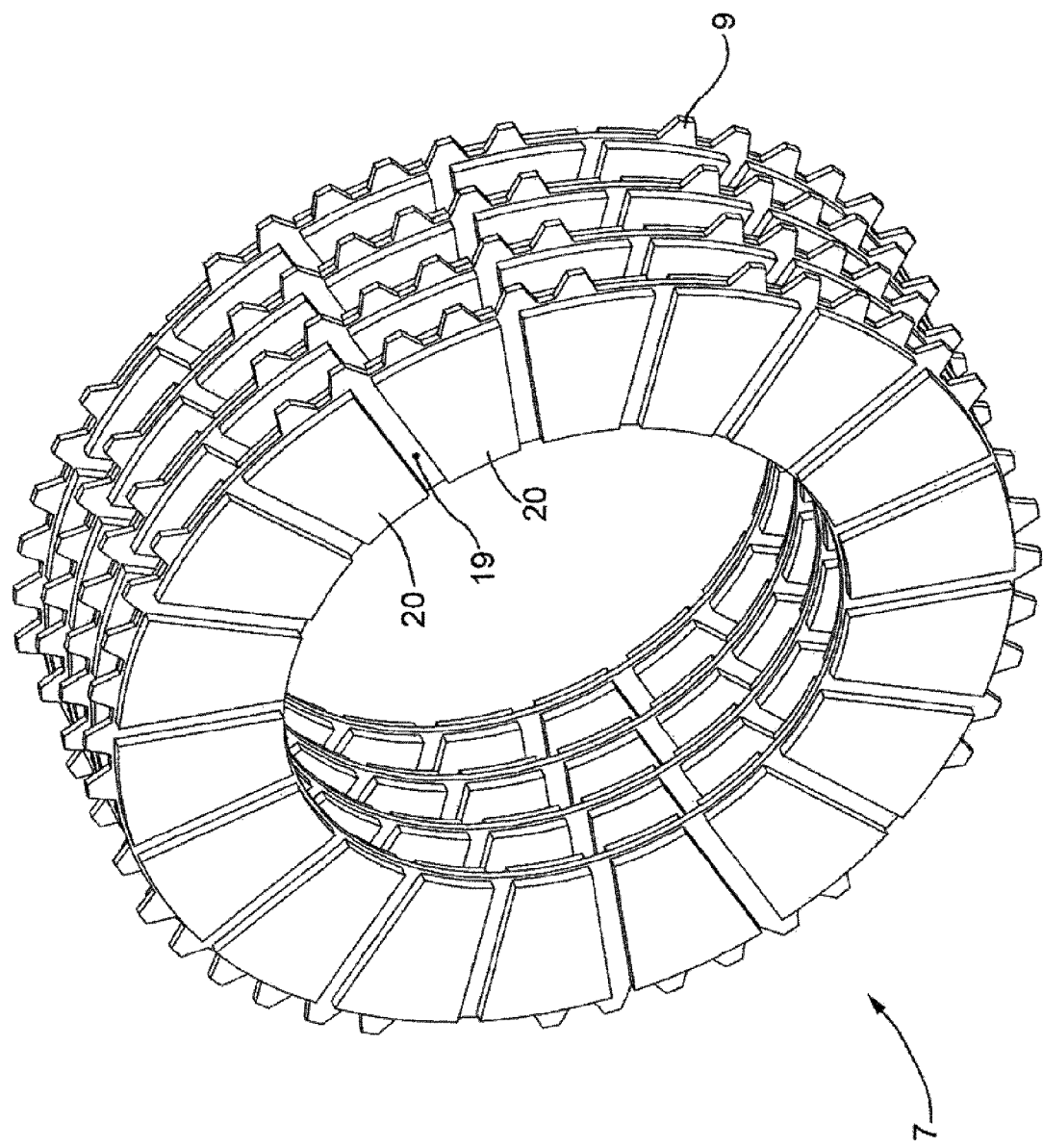
FIG. 19 shows a view in perspective of a drive-disk pack of the FIG. 1 clutch.
Figure 20:
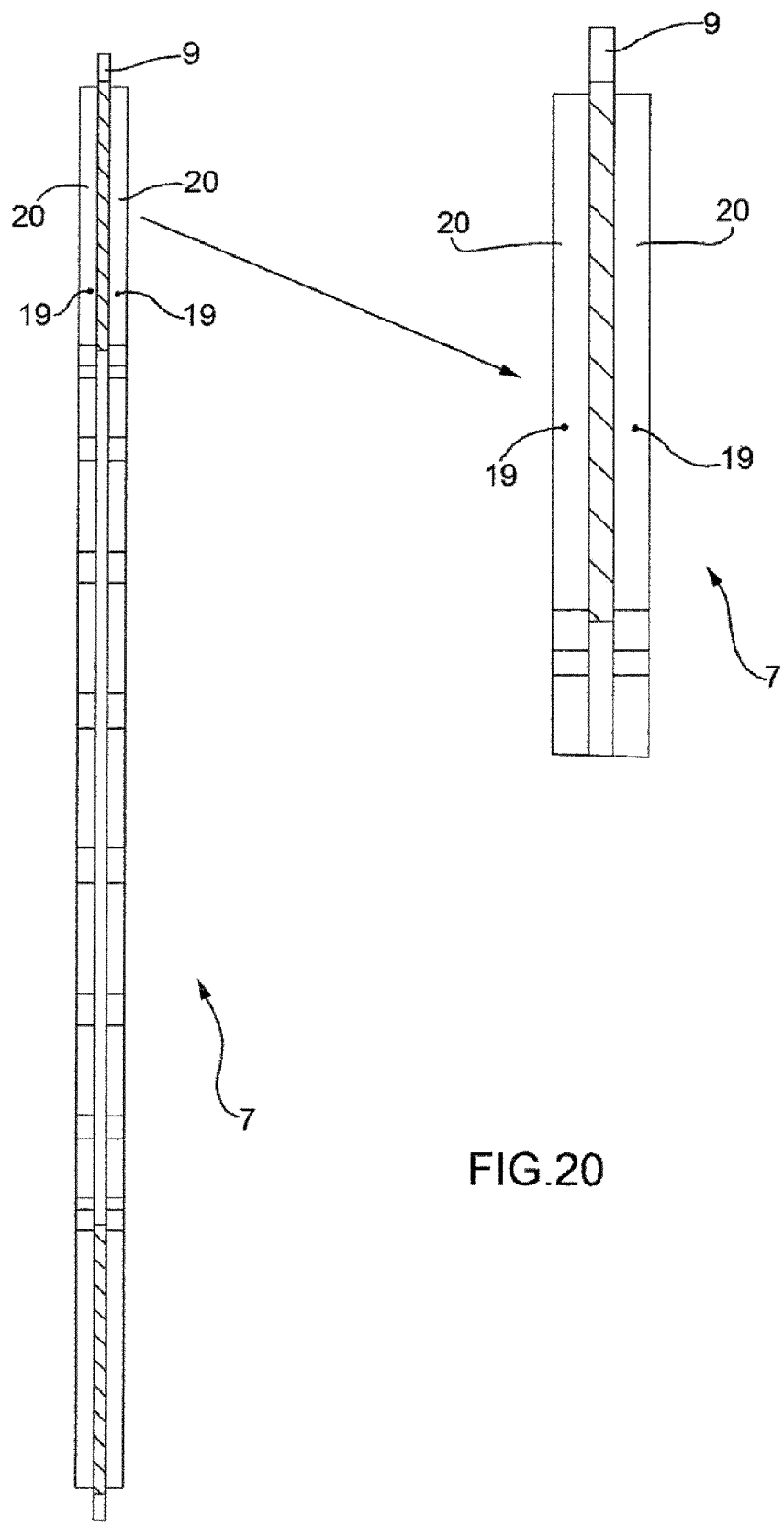
FIG. 20 shows a cross section of a drive disk in the FIG. 19 drive-disk pack.
Figure 21:
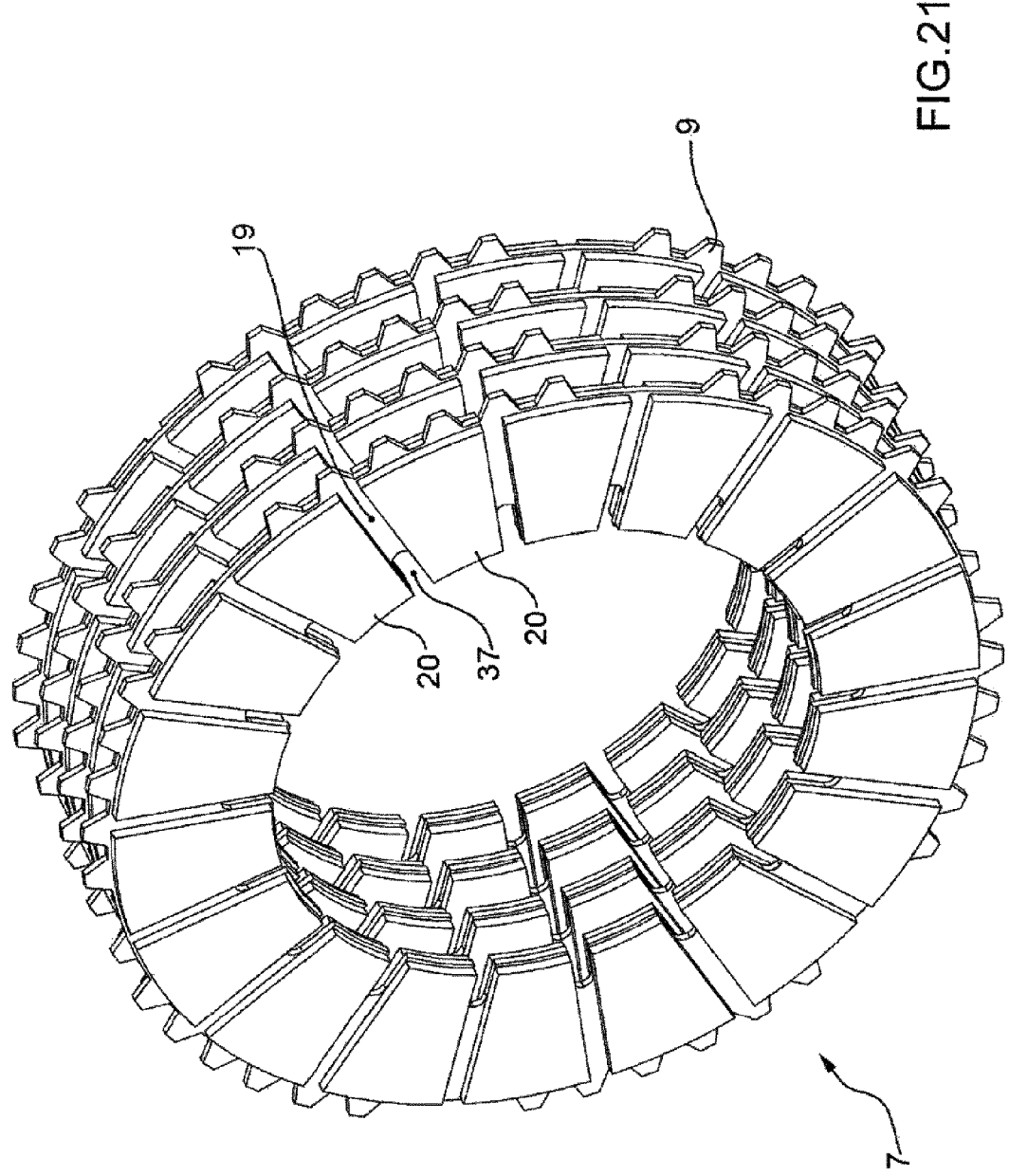
FIG. 21 shows a view in perspective of an alternative embodiment of the drive-disk pack of the FIG. 1 clutch.
Figure 22:
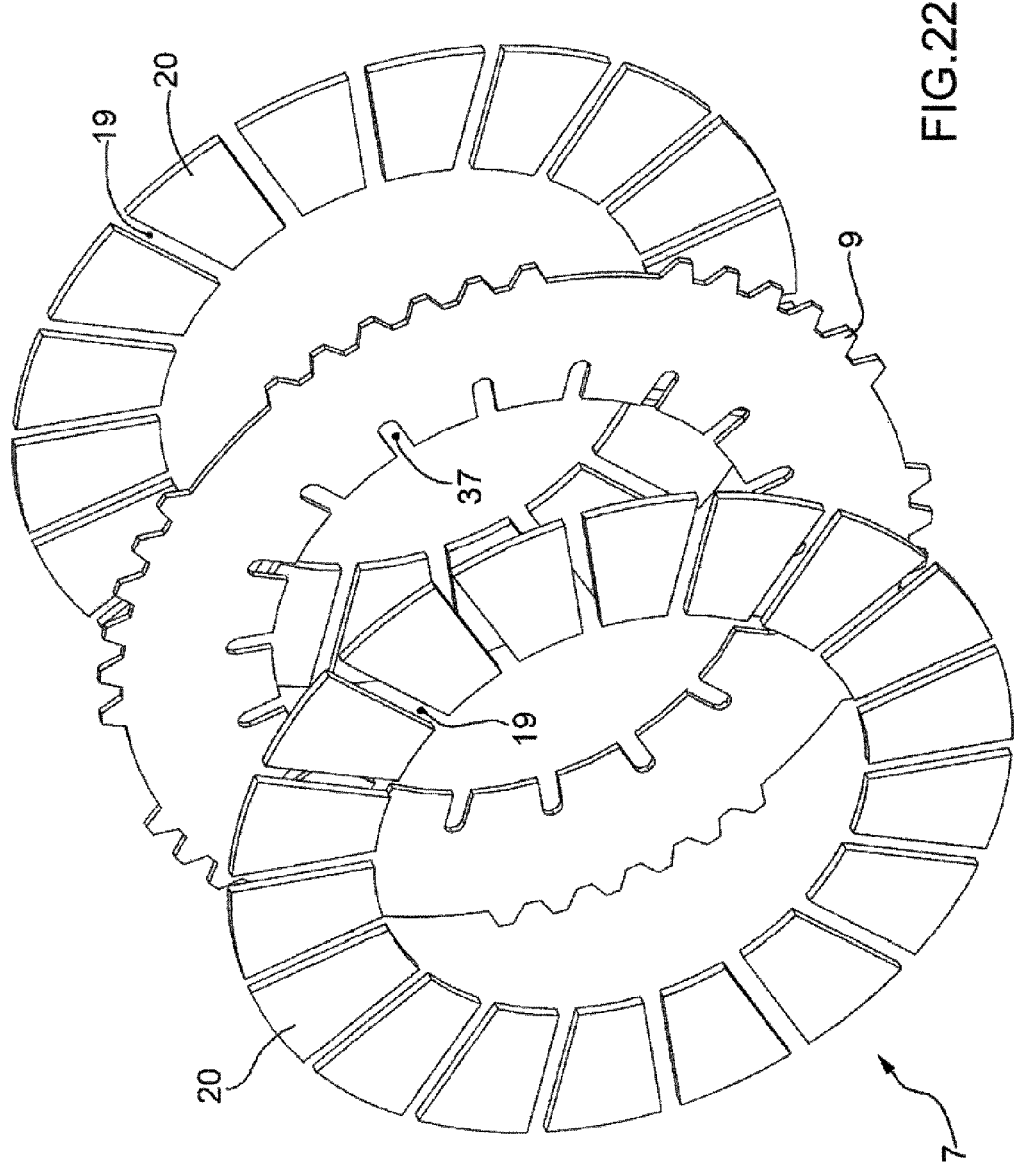
FIG. 22 shows an exploded view in perspective of the drive-disk pack in FIG. 21.
Figure 23:
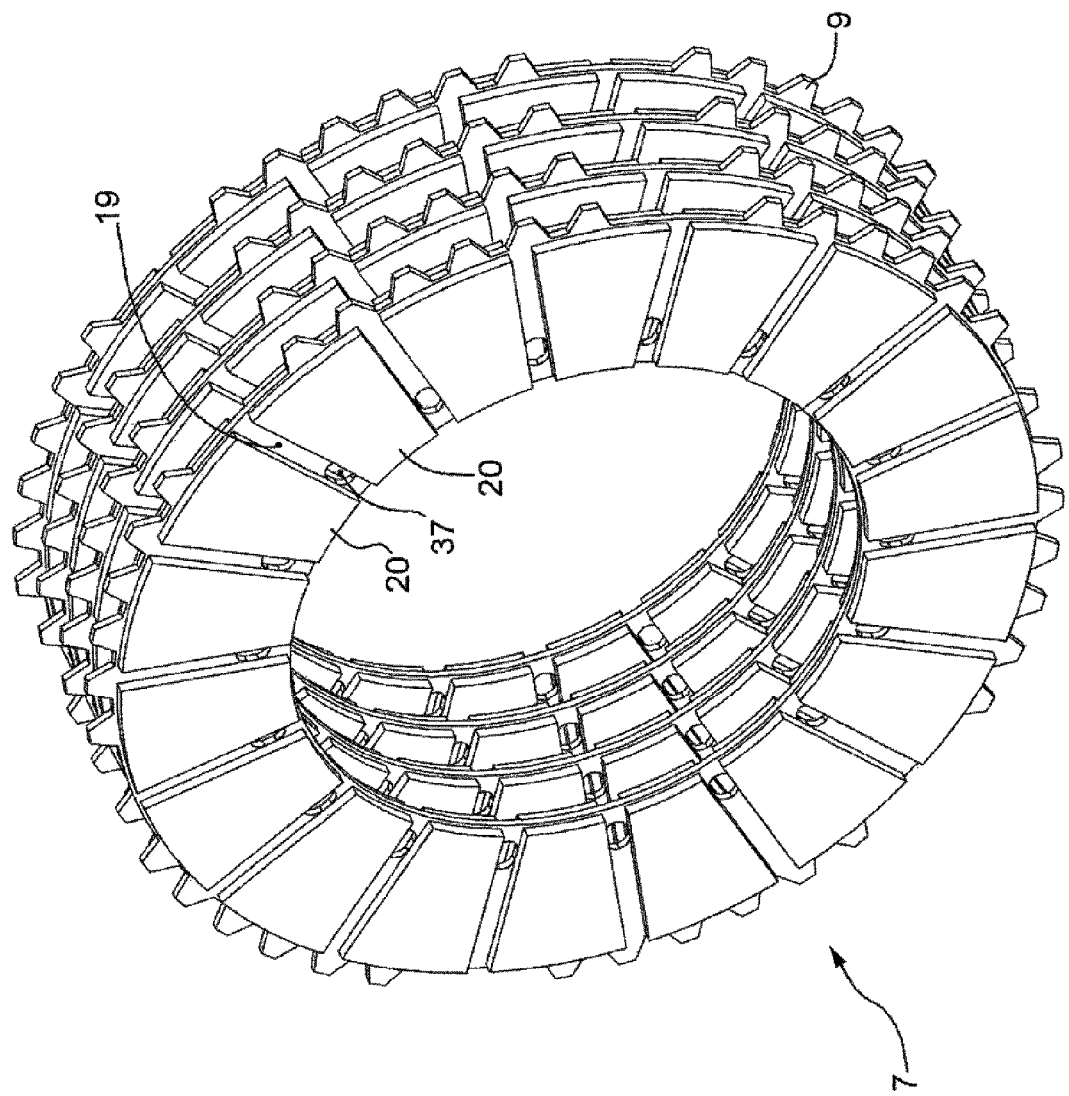
FIG. 23 shows a view in perspective of an alternative embodiment of the driven-disk pack of the FIG. 1 clutch.
Figure 24:
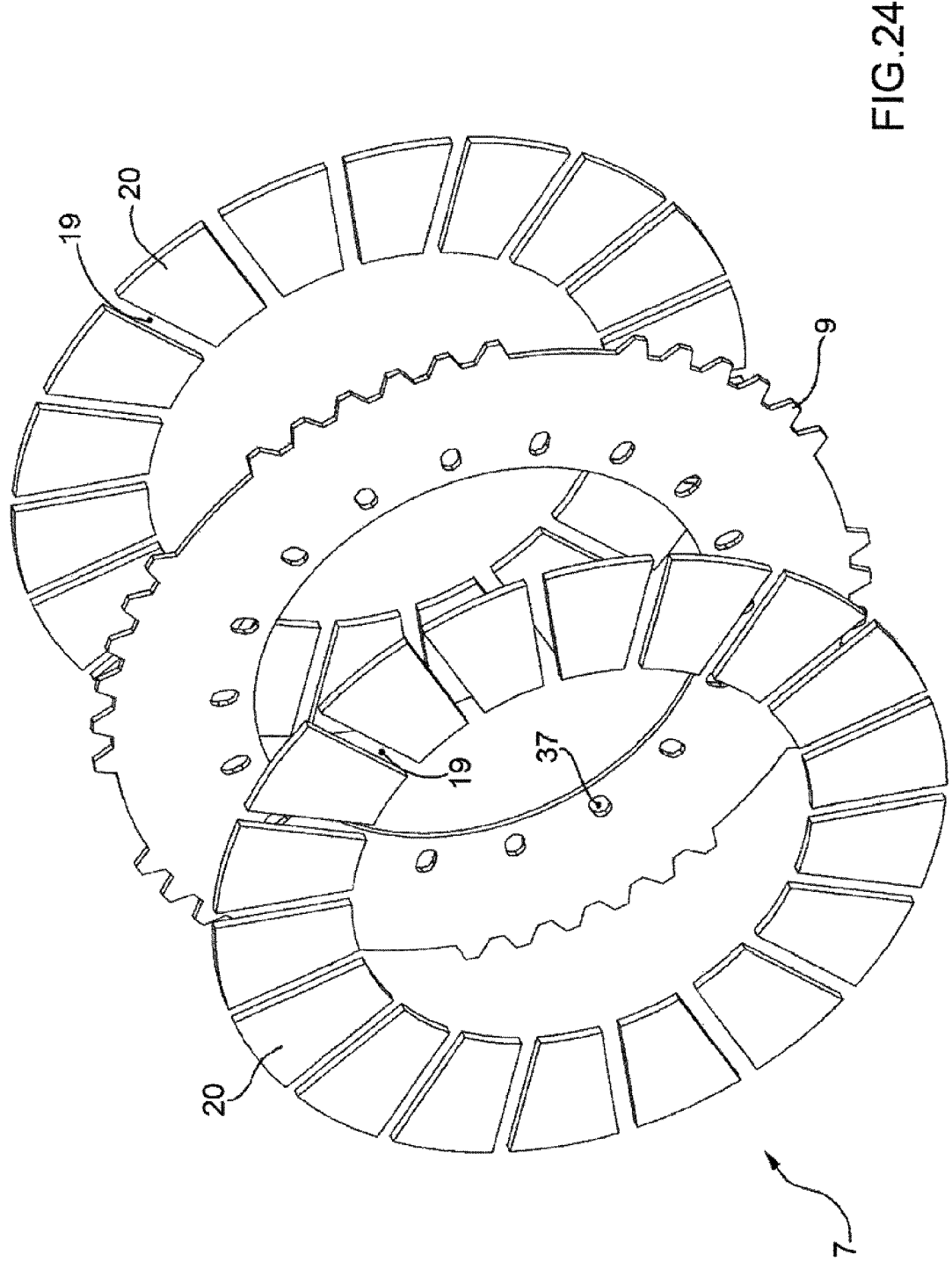
FIG. 24 shows an exploded view in perspective of the FIG. 23 driven-disk pack.
Figure 25:
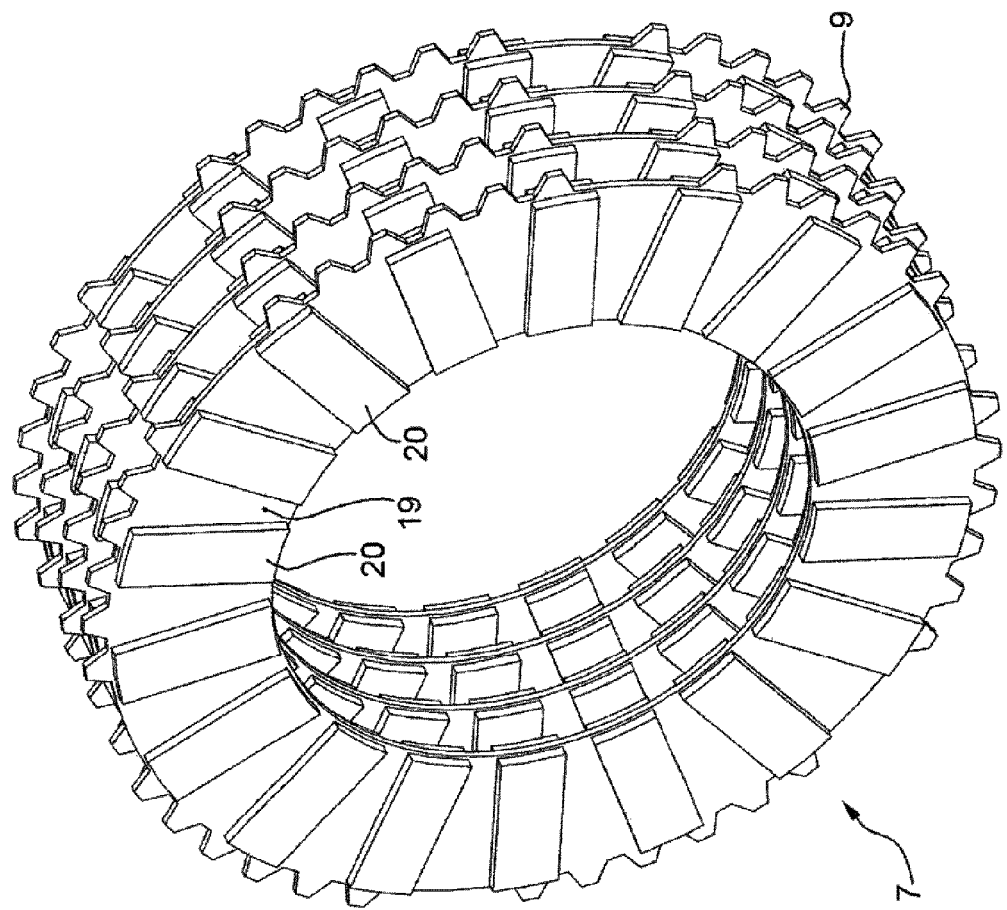
FIG. 25 shows a view in perspective of an alternative embodiment of the driven-disk pack of the FIG. 1 clutch.
Figure 26:
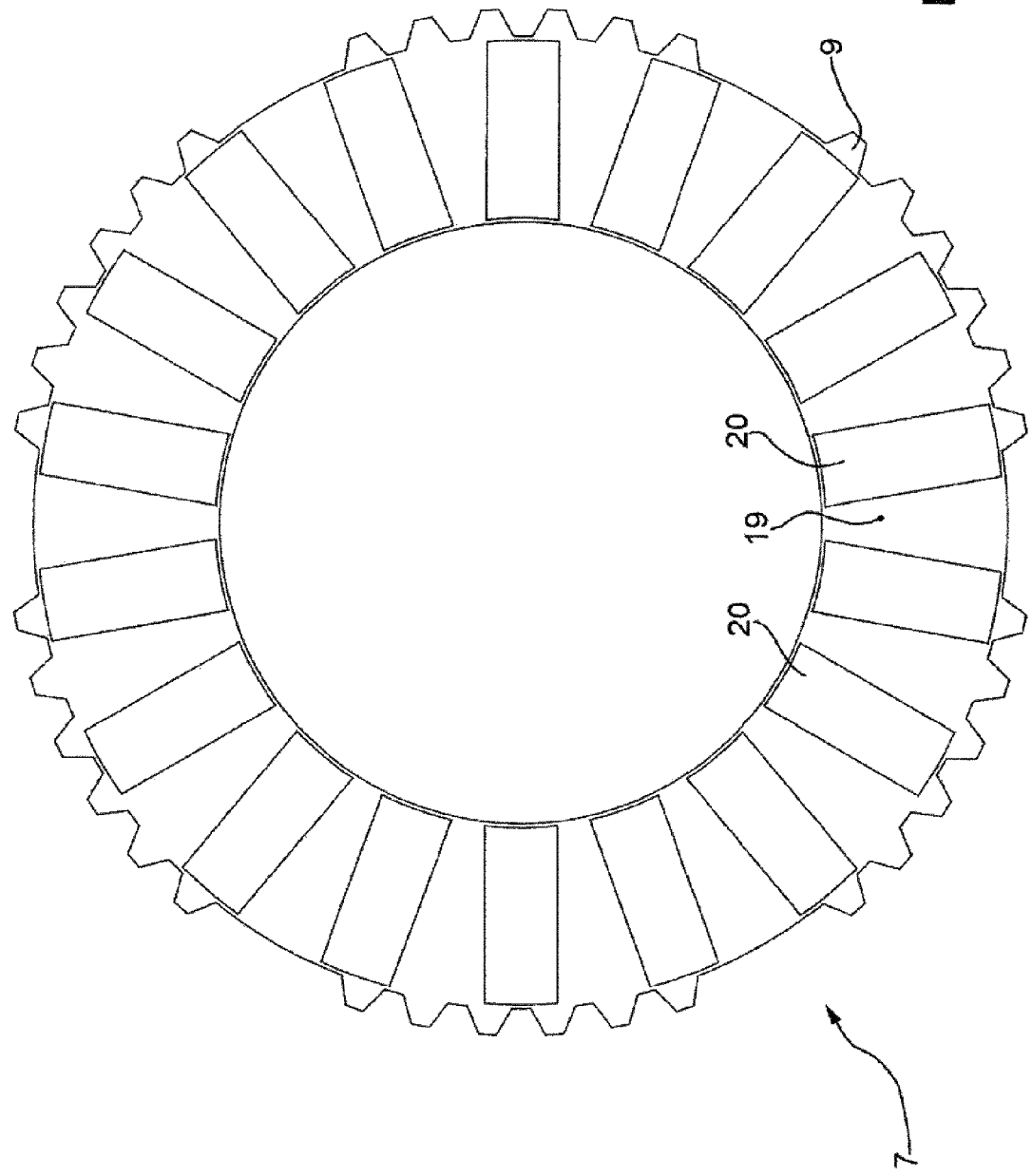
FIG. 26 shows a front view of the FIG. 25 drive-disk pack.
Figure 27:
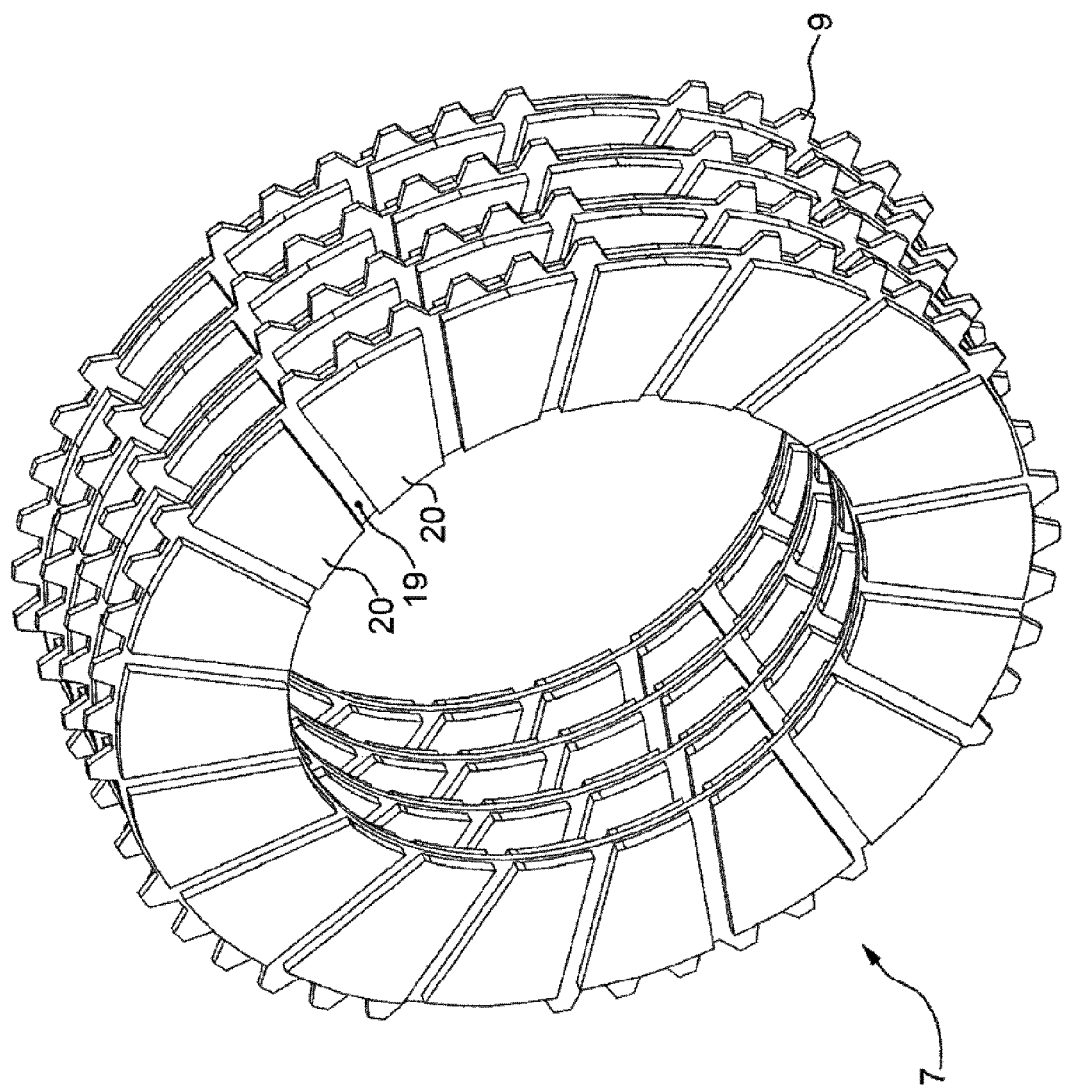
FIG. 27 shows a view in perspective of an alternative embodiment of the driven-disk pack of the FIG. 1 clutch.
Figure 28:
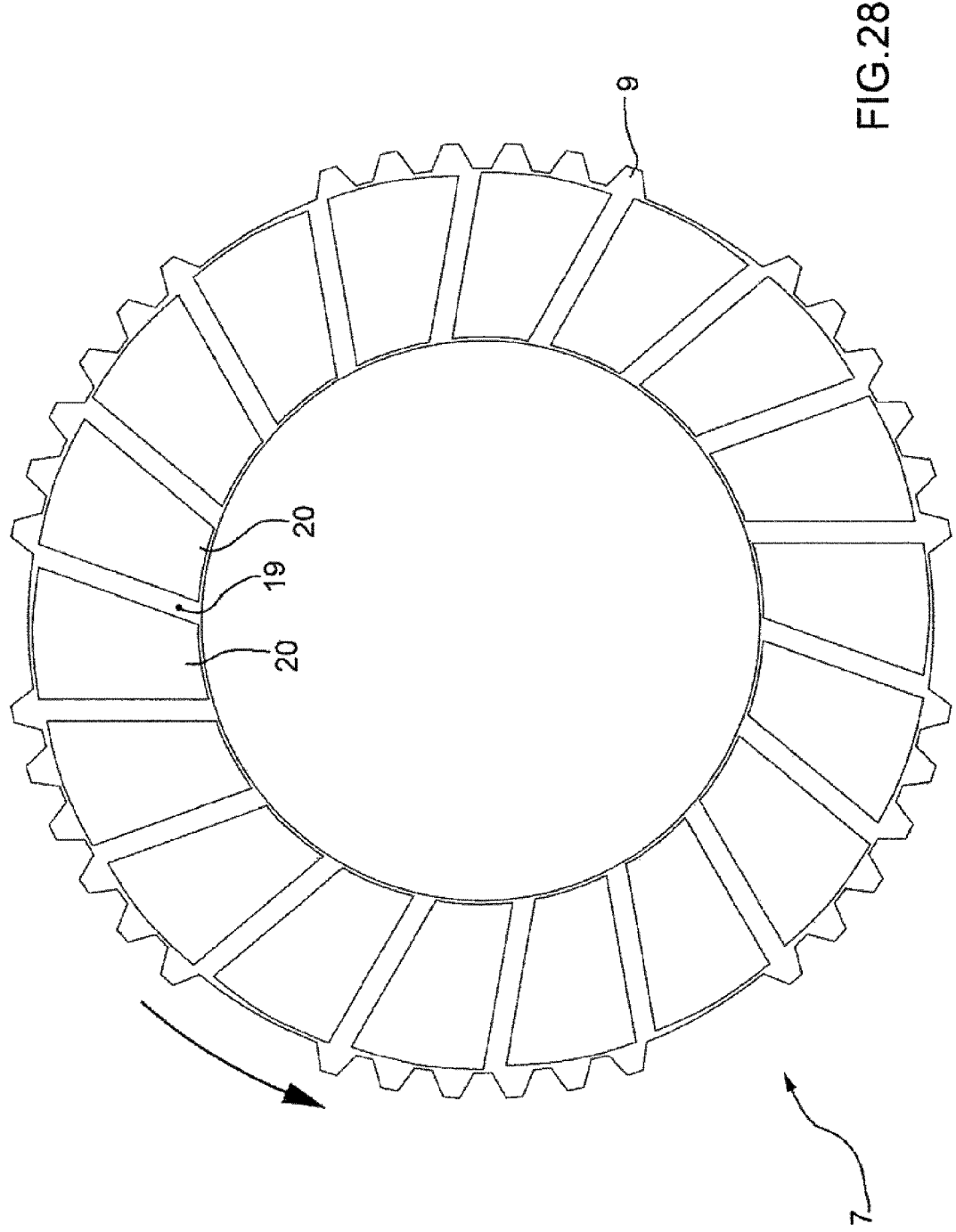
FIG. 28 shows a front view of the FIG. 27 drive-disk pack.
Figure 29:
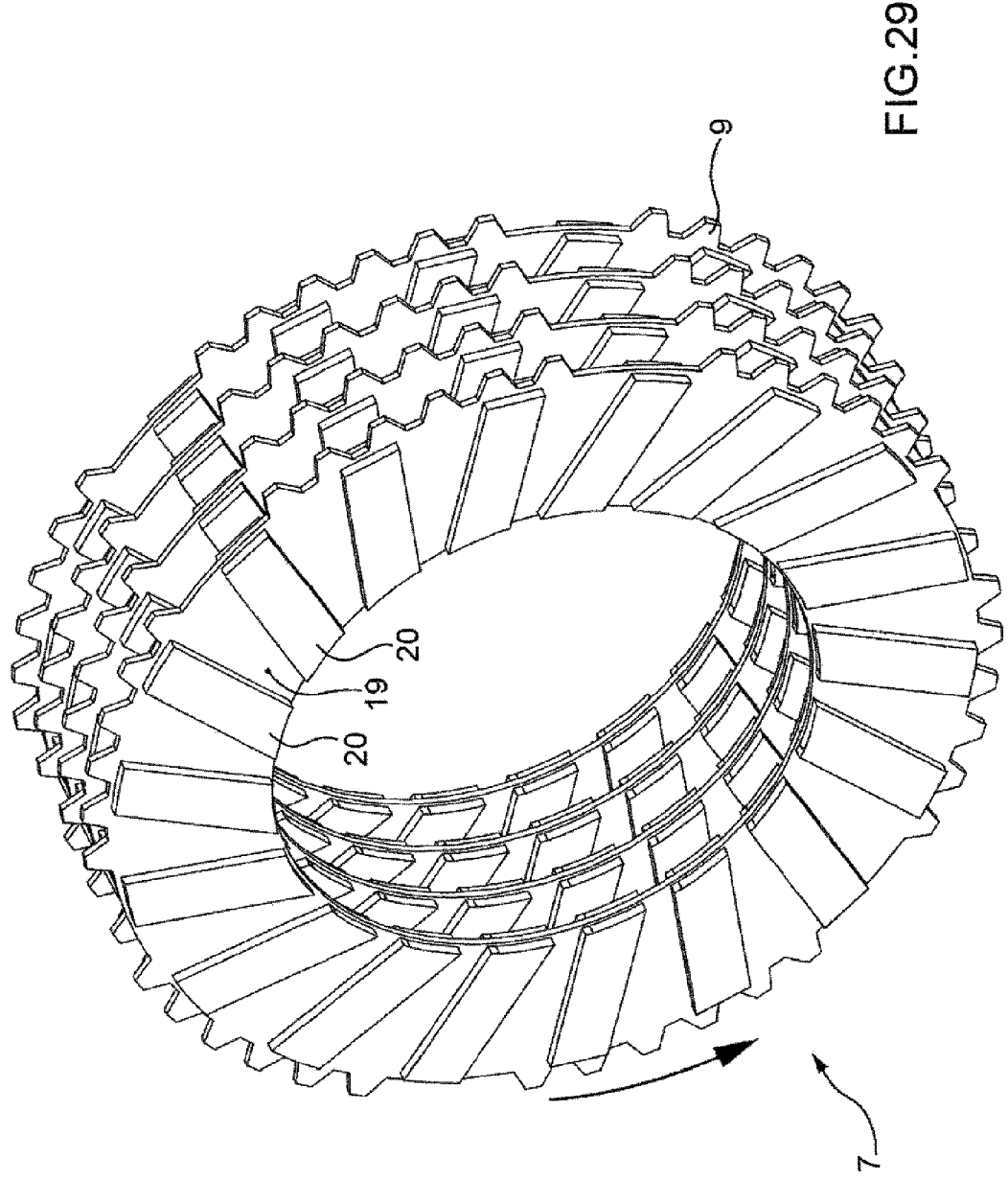
FIG. 29 shows a view in perspective of an alternative embodiment of the driven-disk pack of the FIG. 1 clutch.
Figure 30:
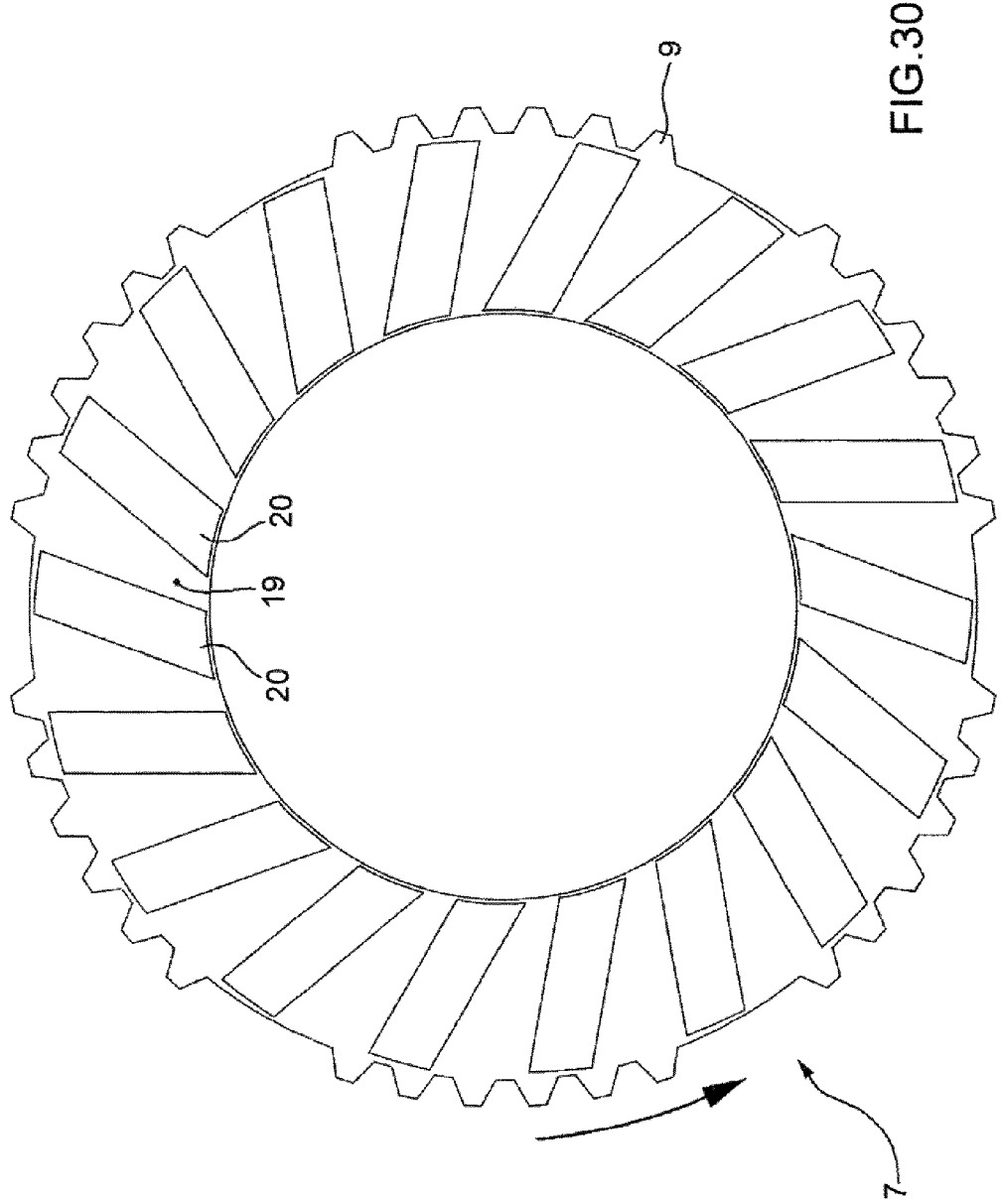
FIG. 30 shows a front view of the FIG. 29 drive-disk pack.
Figure 31:
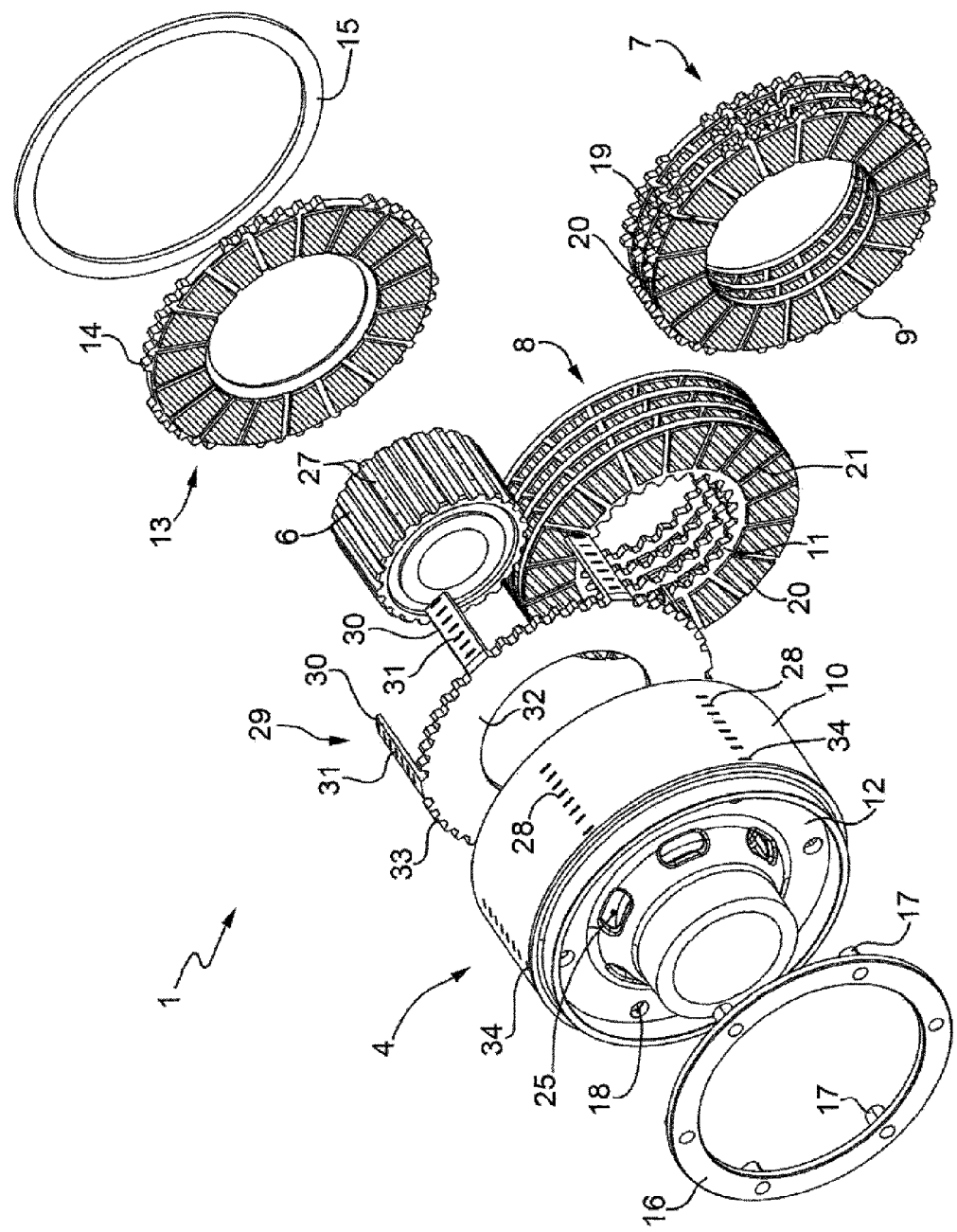
FIG. 31 shows an exploded view in perspective, with parts removed for clarity, of an alternative embodiment of the FIG. 1 clutch.
Figure 32:
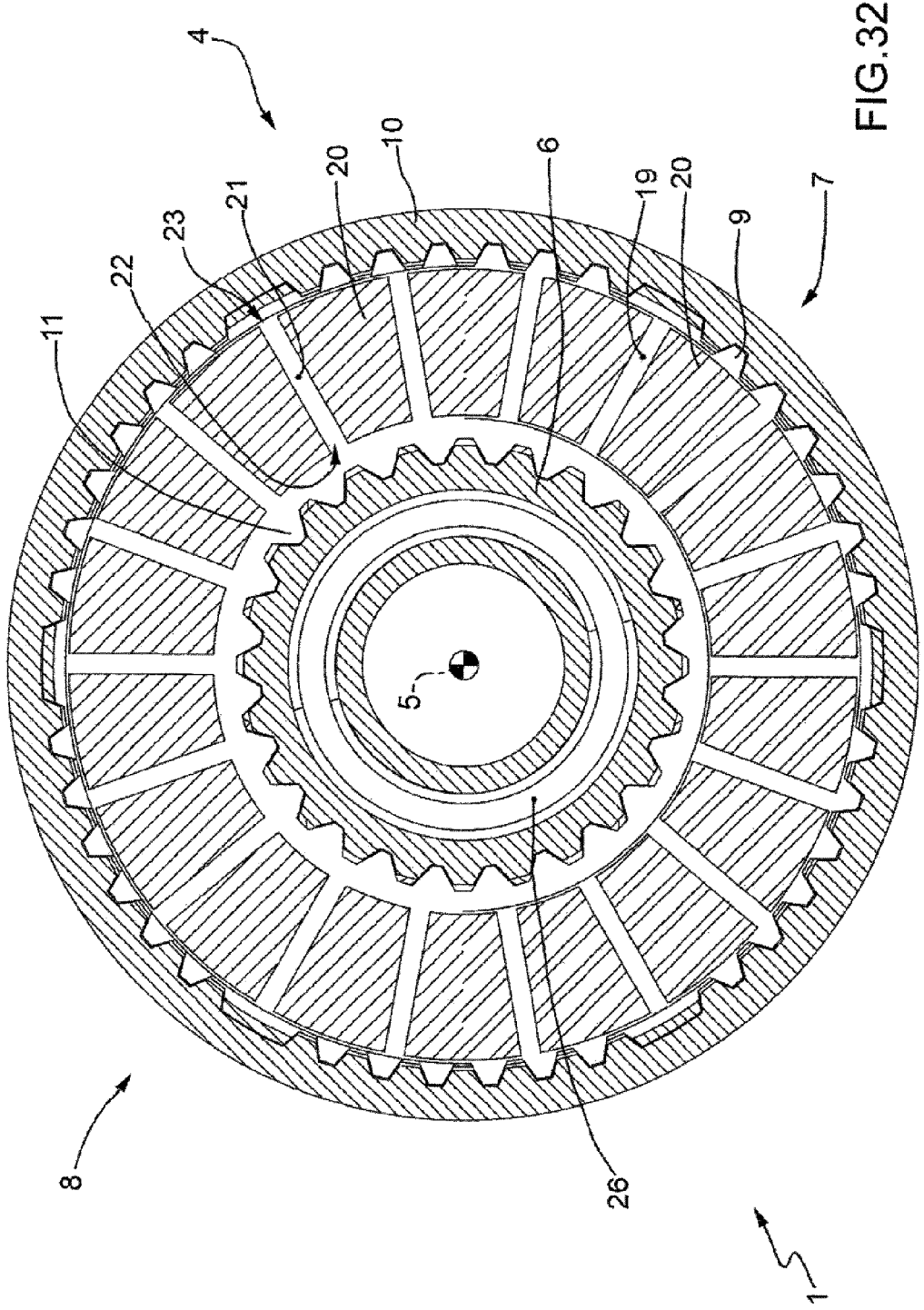
FIG. 32 shows a cross section of a disk pack of the FIG. 1 clutch.
Figure 33:
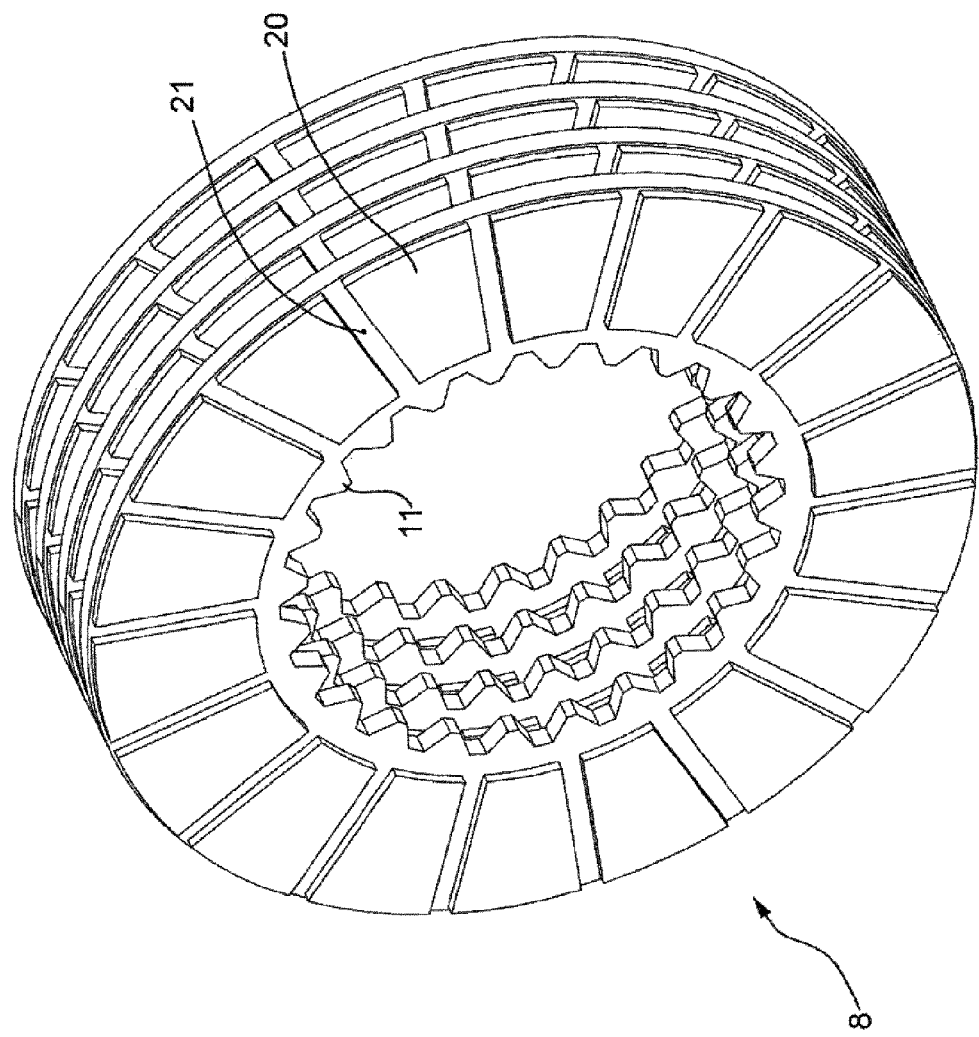
FIG. 33 shows a view in perspective of a driven-disk pack of the FIG. 31 clutch.
Figure 34:
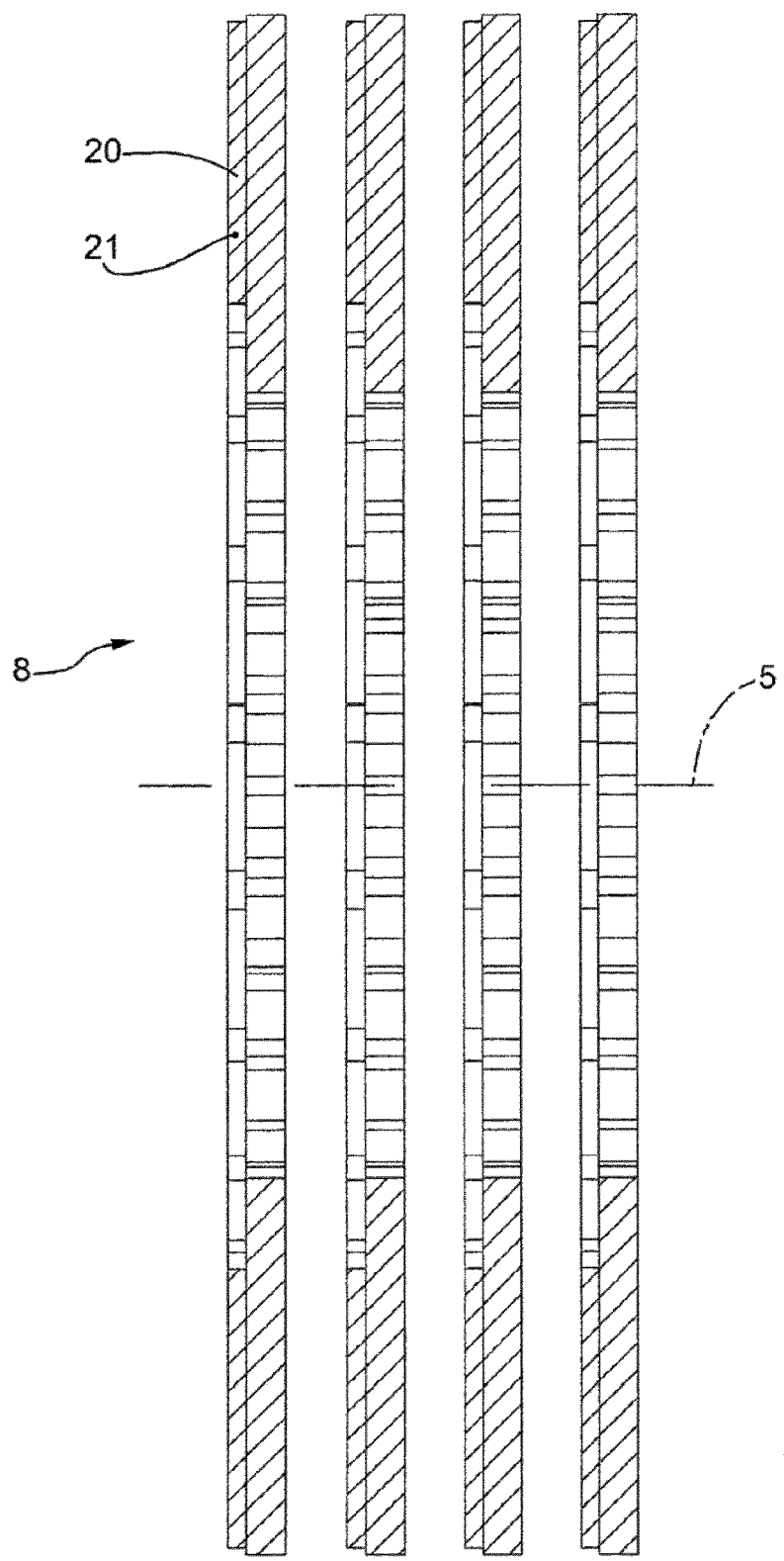
FIG. 34 shows a cross section of the FIG. 33 driven-disk pack.
Figure 35:
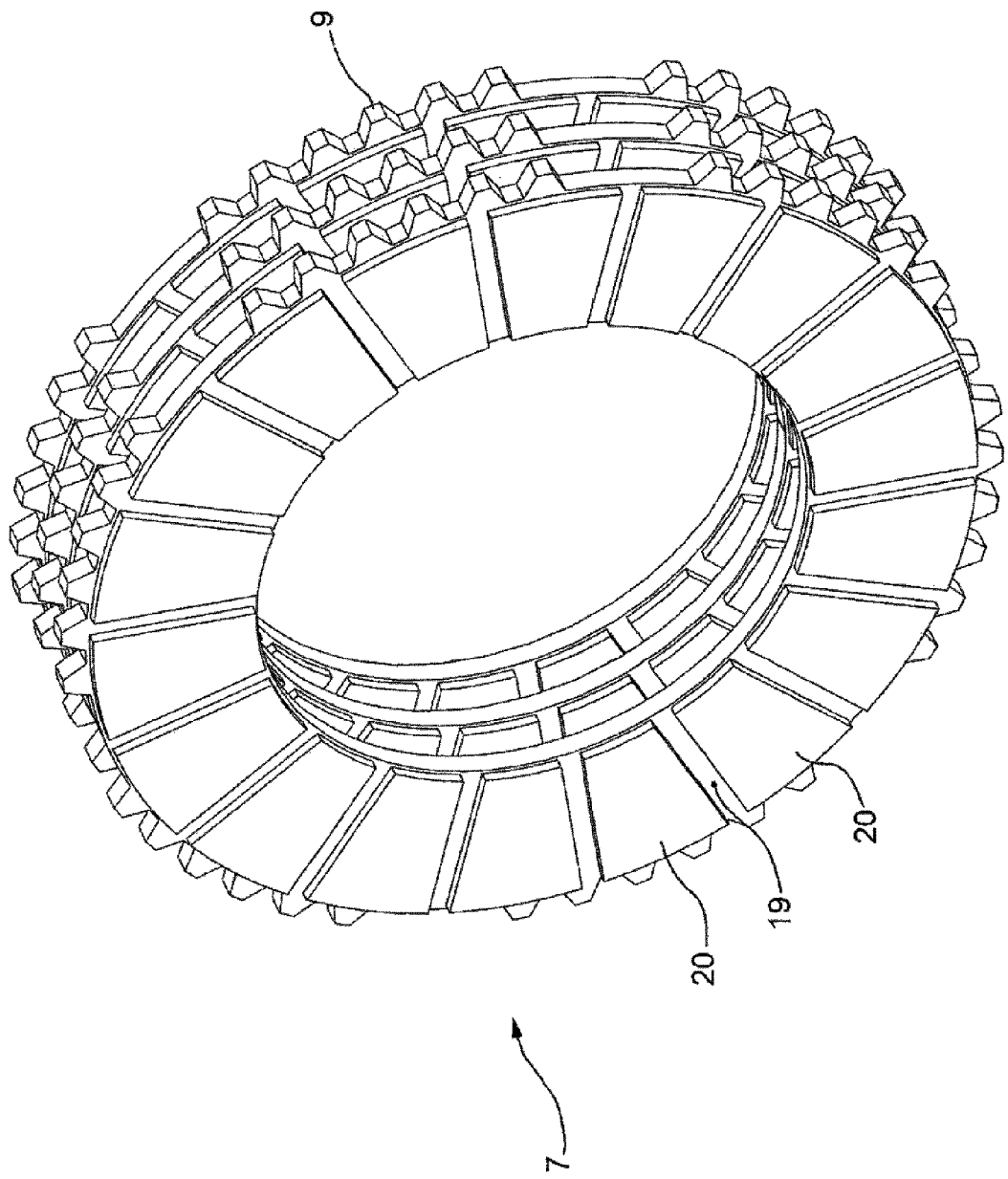
FIG. 35 shows a view in perspective of a drive-disk pack of the FIG. 31 clutch.
Figure 36:
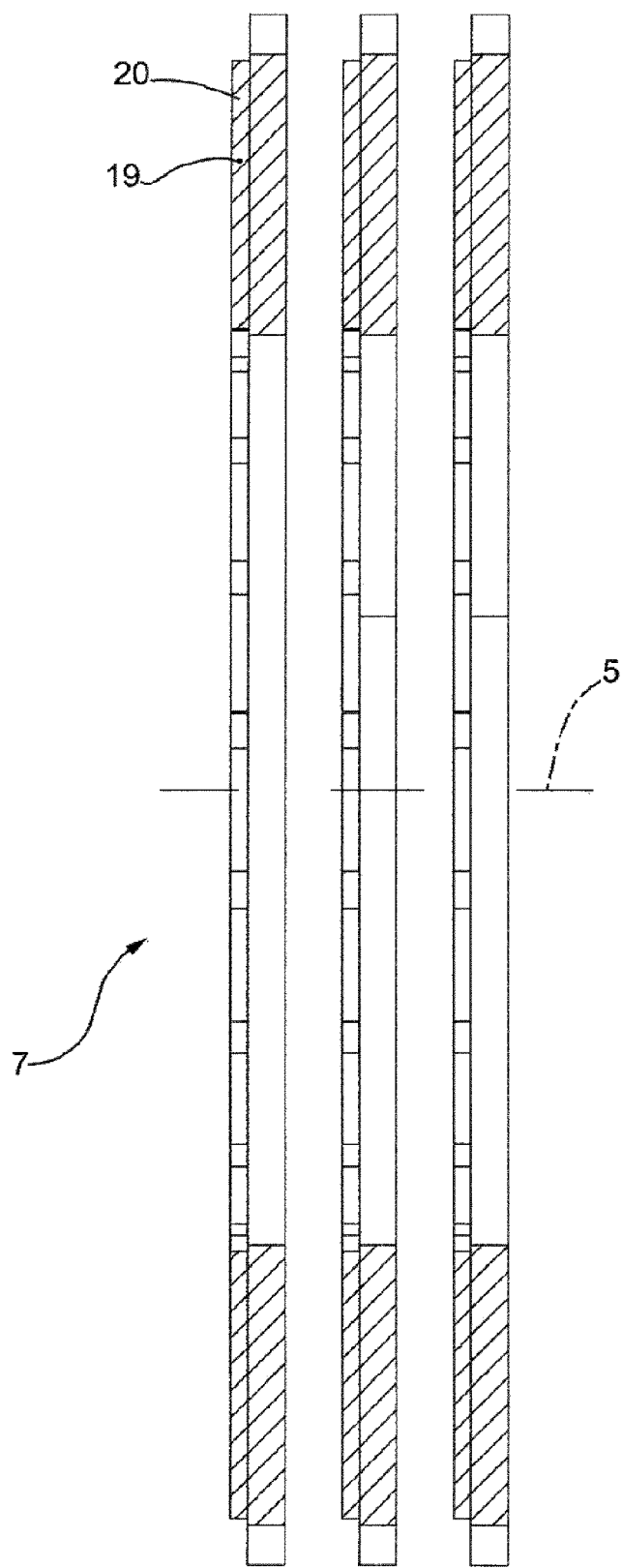
FIG. 36 shows a cross section of the FIG. 35 drive-disk pack.
Figure 37:
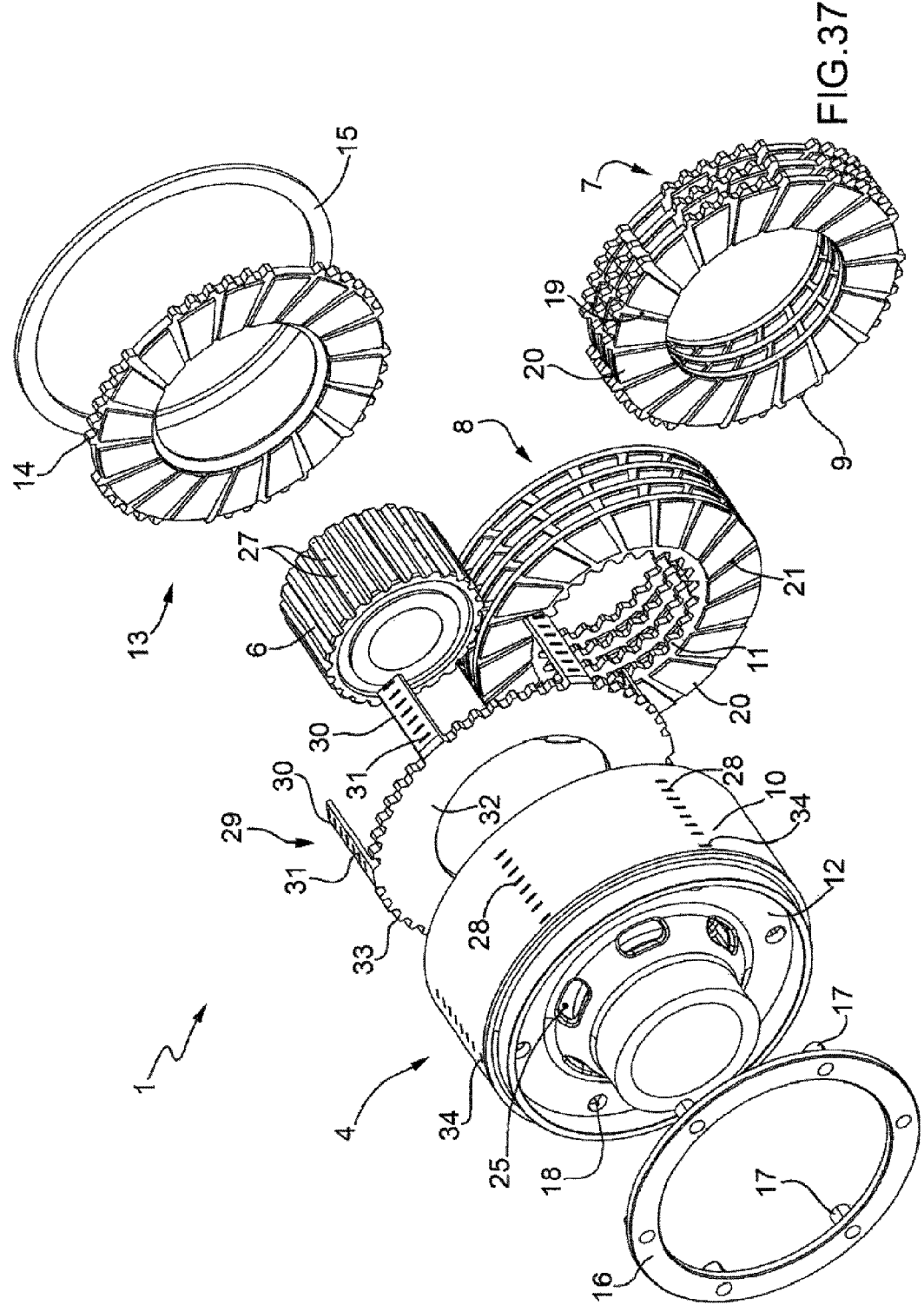
FIG. 37 shows an exploded view in perspective, with parts removed for clarity, of an alternative embodiment of the FIG. 1 clutch.
Figure 38:
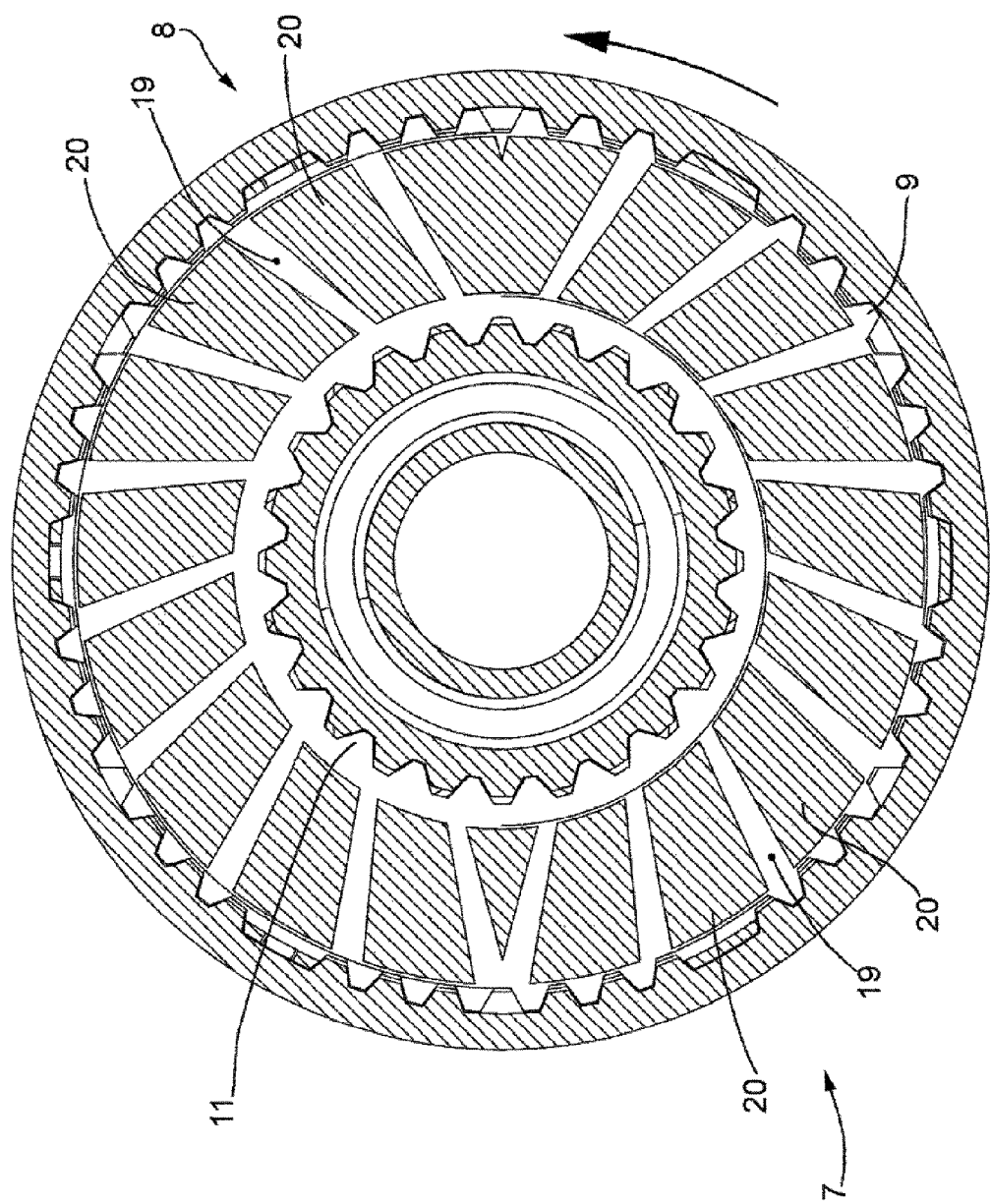
FIG. 38 shows a cross section of a disk pack of the FIG. 37 clutch.
Figure 39:
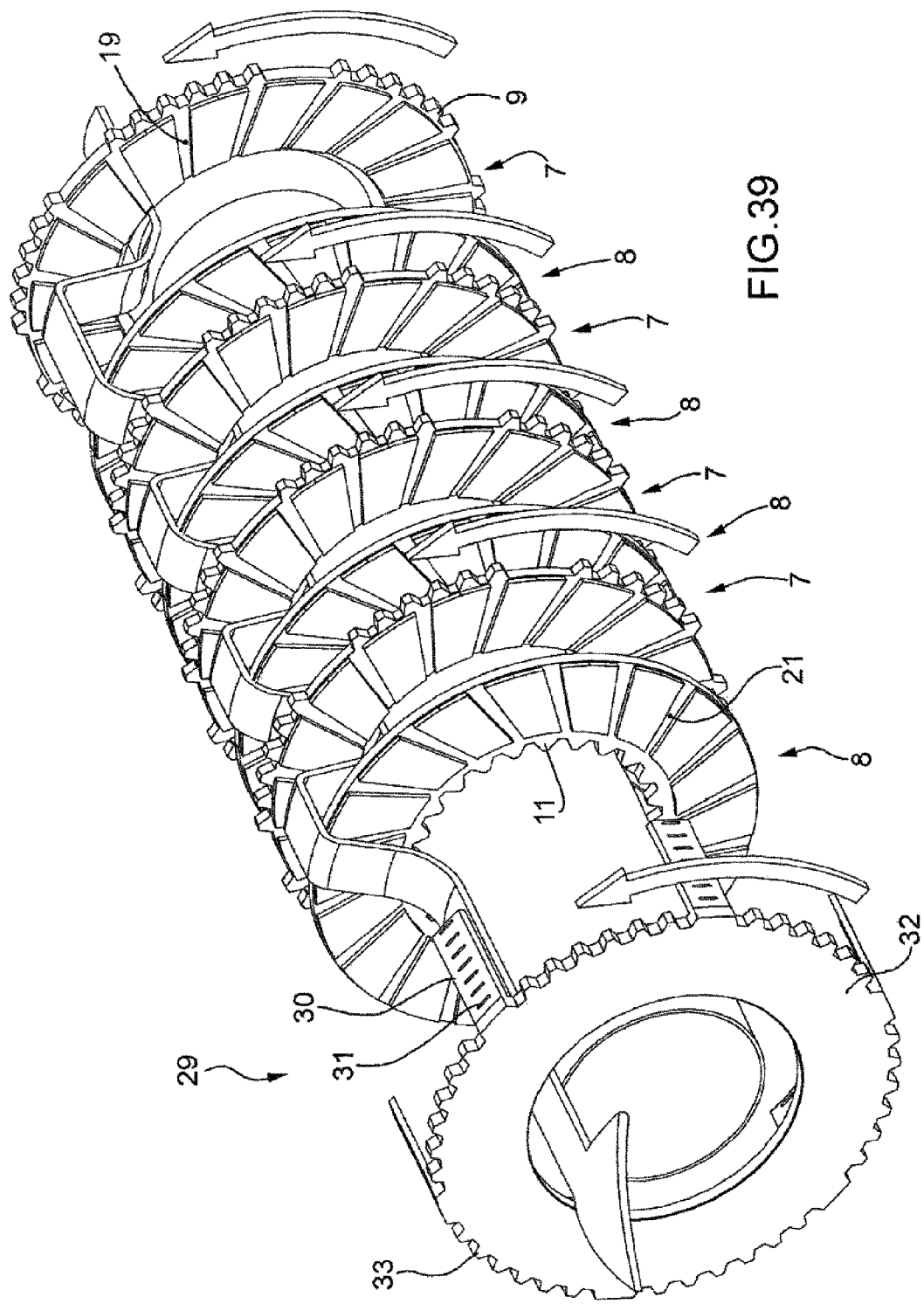
FIG. 39 shows an exploded view in perspective of a disk pack of the FIG. 37 clutch and oil flow.
Figure 40:
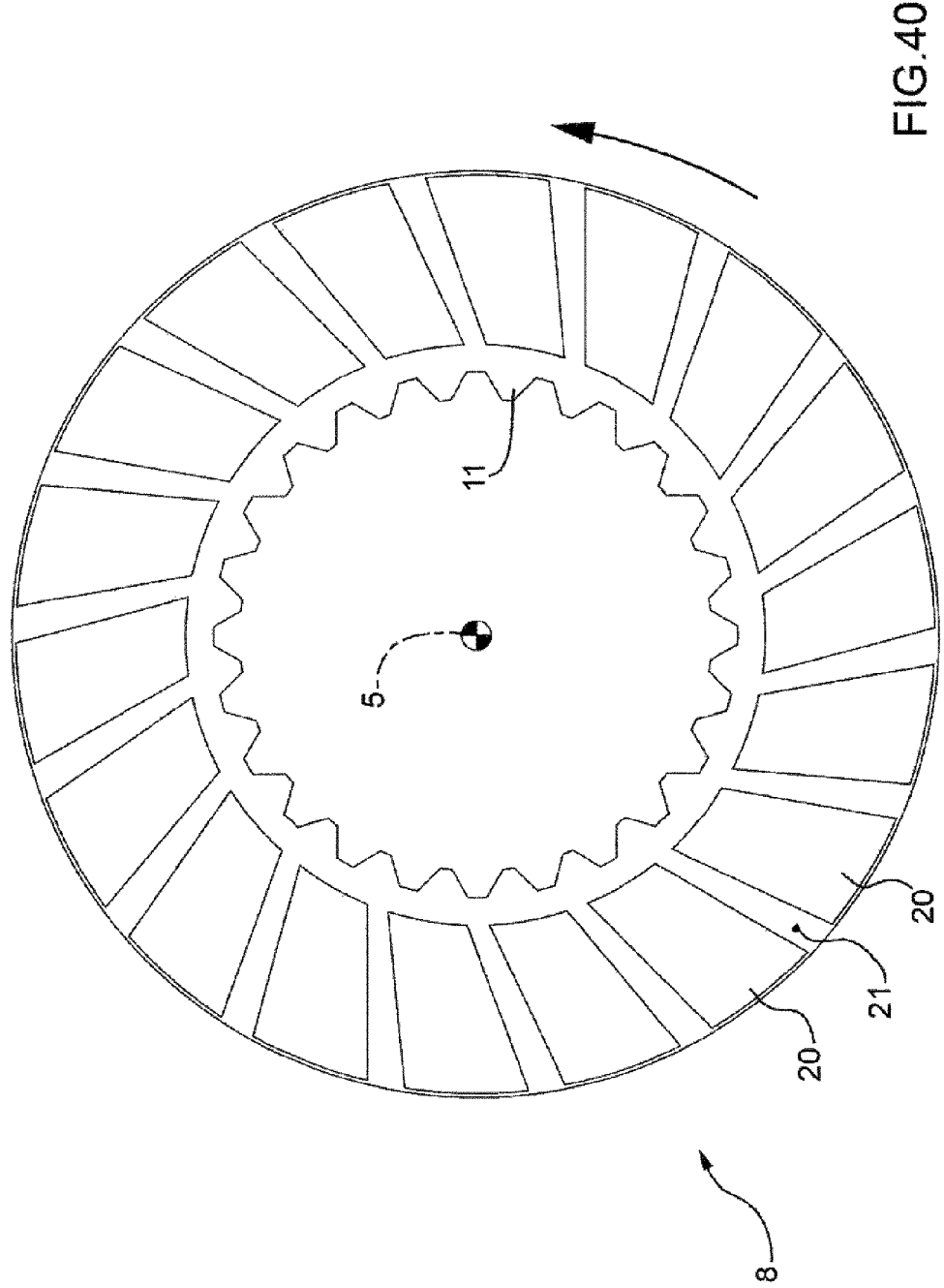
FIG. 40 shows a front view of a driven disk of the FIG. 37 clutch.
Figure 41:
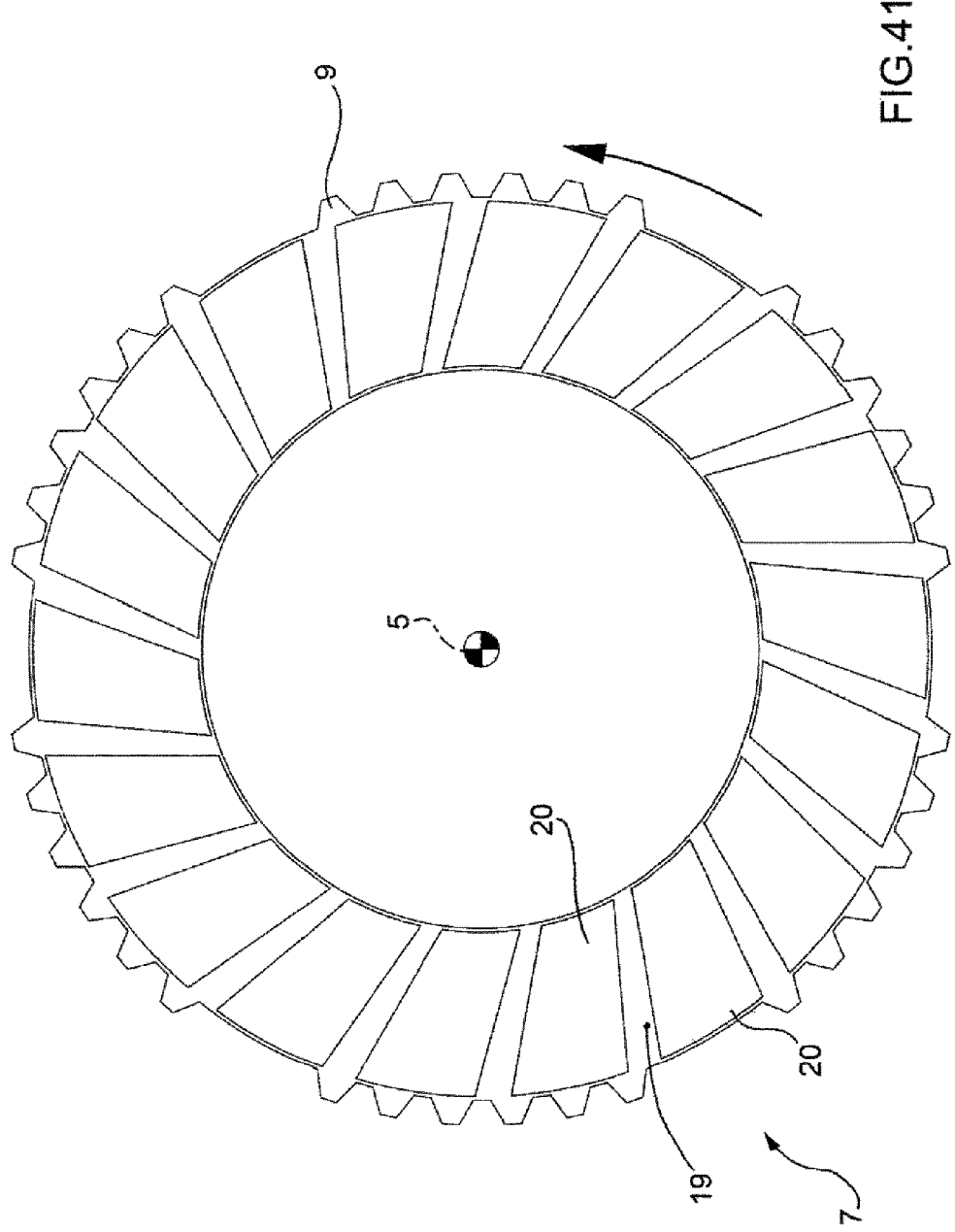
FIG. 41 shows a front view of a drive disk of the FIG. 37 clutch.
Figure 42:
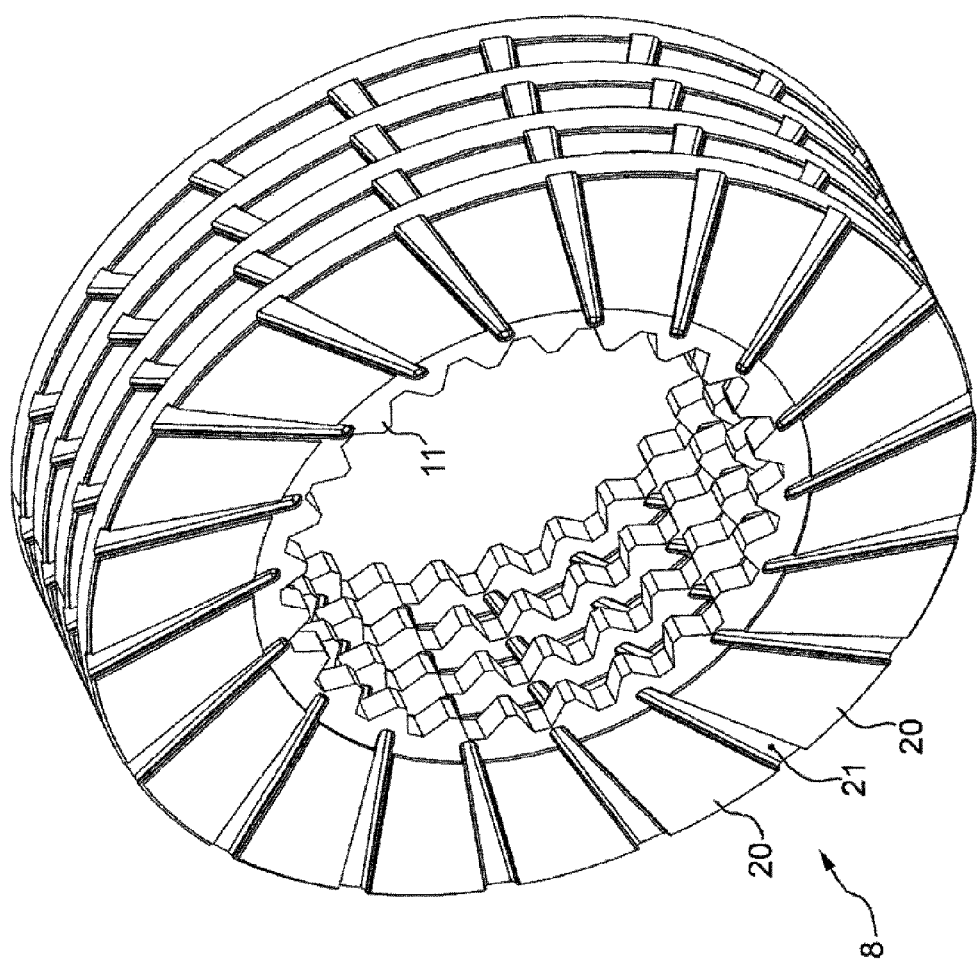
FIG. 42 shows a view in perspective of an alternative embodiment of the driven-disk pack of the FIG. 37 clutch.
Figure 43:
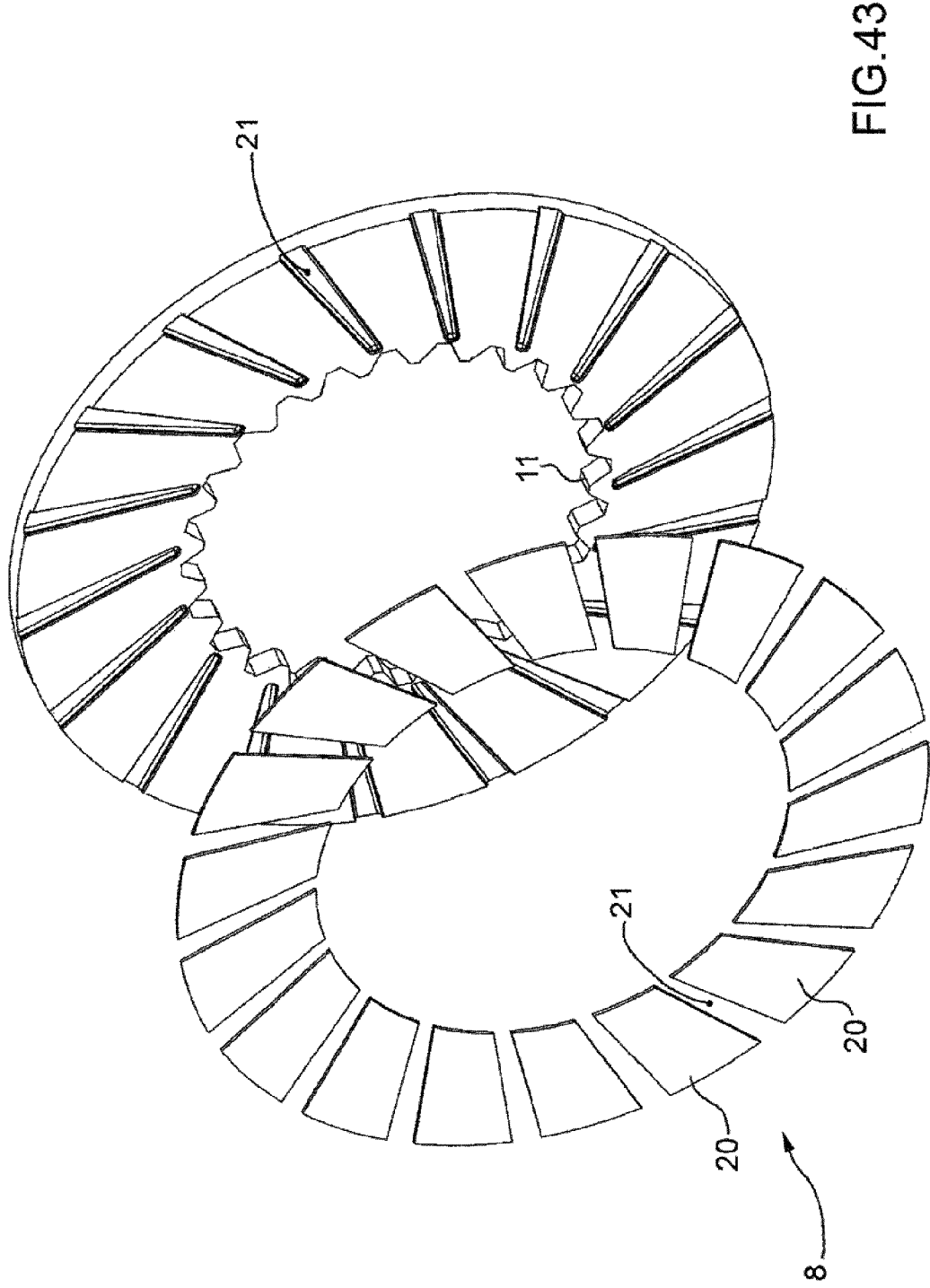
FIG. 43 shows an exploded view in perspective of the FIG. 42 driven-disk pack.
Figure 44:
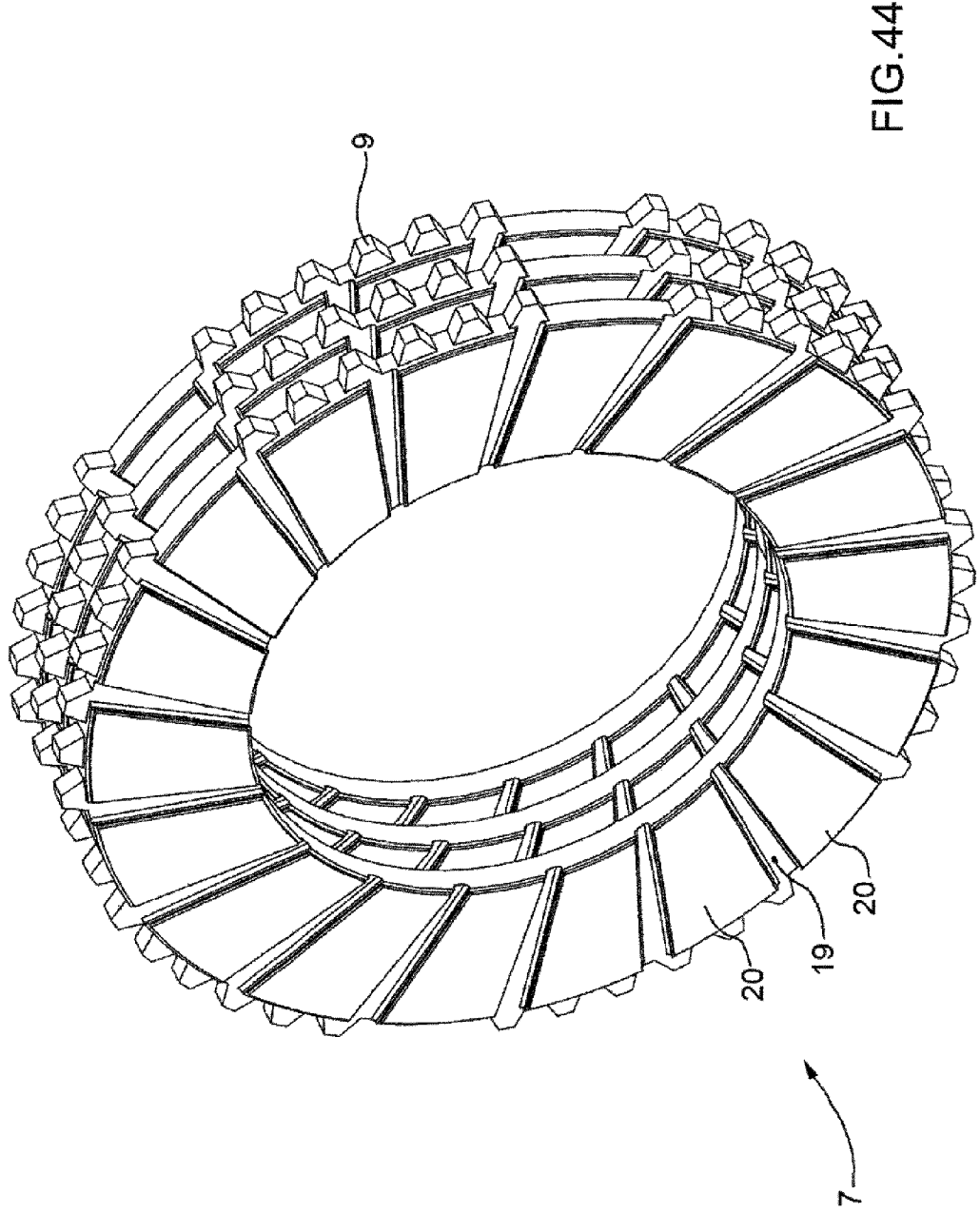
FIG. 44 shows a view in perspective of an alternative embodiment of the drive-disk pack of the FIG. 37 clutch.
Figure 45:
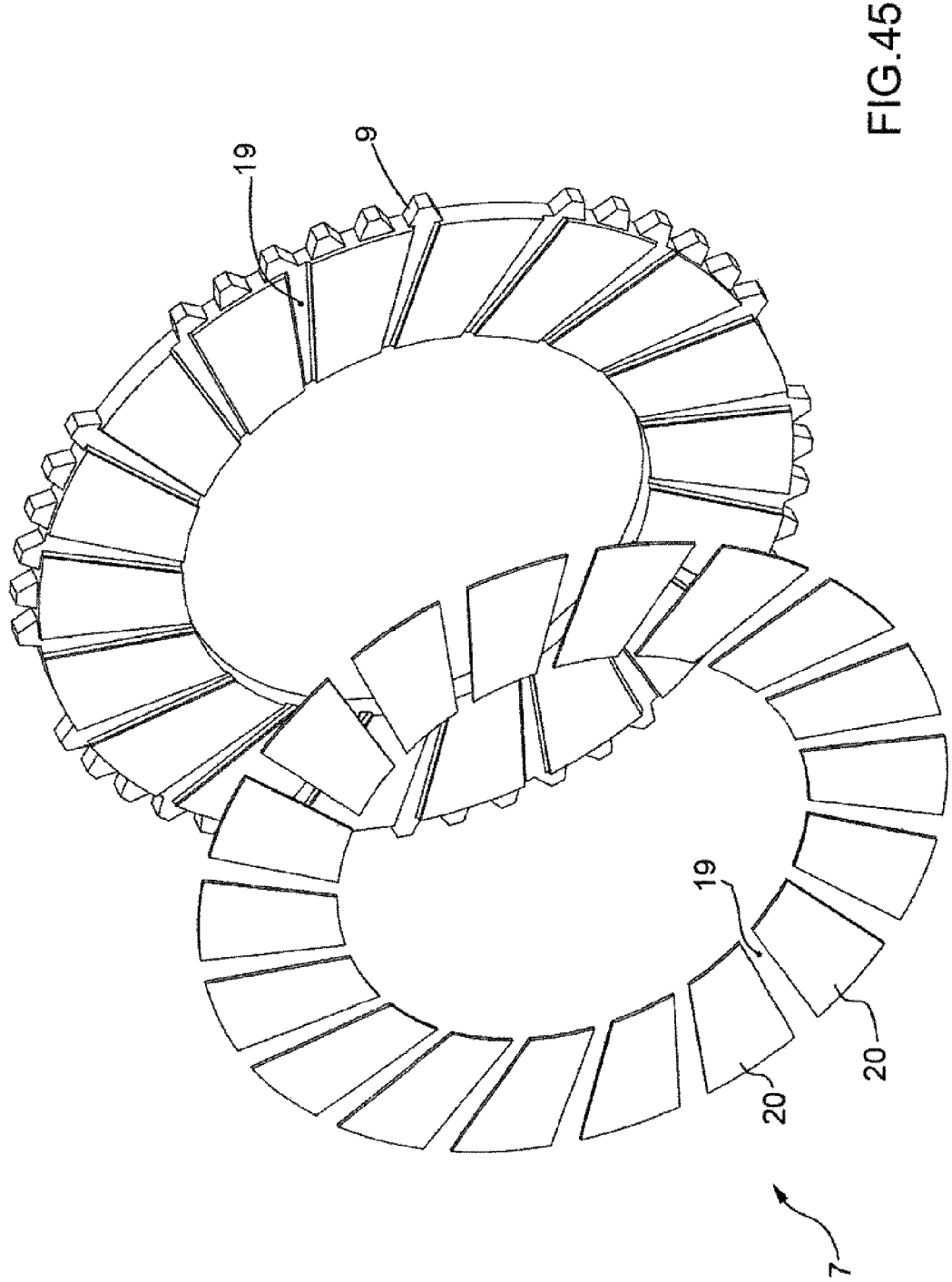
FIG. 45 shows an exploded view in perspective of the FIG. 43 drive-disk pack.

As shown in FIGS. 19 and 20, each circulation channel 19 is oriented radially (i.e., is coaxial with, i.e., slopes at a zero angle with respect to, a respective radius). In the FIG. 27-30 embodiment, each circulation channel 19 slopes with respect to the radial, and forms an acute angle with the rotation direction. This orientation of circulation channels 19 enhances the centrifugal effect inside circulation channels 19, and so improves outward oil circulation along circulation channels 19 (in other words, the rotation direction forms an acute angle with respect to the oil, thus producing a "chisel" effect which enhances the centrifugal effect).

As shown in FIGS. 19 and 20, each circulation channel 19 has a constant cross section. In the FIGS. 25, 26, 29 and 30 embodiments, the cross section of each circulation channel 19 increases outwards (in a variation not shown, the cross section increases inwards, i.e., decreases outwards).

In the FIG. 21-24 embodiment, drive disks 7 have axial through holes 37 (i.e., parallel to longitudinal axis of rotation 5) that may be located at circulation channels 19 (but which may alternatively be located between circulation channels 19). In the FIGS. 21 and 22 variation, each through hole 37 is located at the inner end of a corresponding circulation channel 19, whereas, in the FIGS. 23 and 24 variation, each through hole 37 is located along a corresponding circulation channel 19. Alternatively, a number of through holes 37 may be provided for each circulation channel 19.

The outer surface of covering 20 of friction material may be either smooth or lined with a given geometric pattern (e.g. parallel lines or a checkerboard line pattern).

In the FIG. 2-30 embodiments, each drive disk 7 has a covering 20 of friction material, and therefore corresponding circulation channels 19, on both its lateral surfaces; and driven disks 8 have smooth lateral surfaces, i.e., with no covering 20 of friction material, and circulation channels 21 of each driven disk 8 are formed in driven disk 8 itself. In the FIG. 31-45 embodiments, each drive disk 7 only has a covering 20 of friction material, and therefore corresponding circulation channels 19, on one of its lateral surfaces, and the other lateral surface is smooth; likewise, each driven disk 8 only has a covering 20 of friction material, and therefore corresponding circulation channels 21, on one of its lateral surfaces, the other lateral surface is smooth, and, like drive disks 7, the circulation channels are formed in covering 20 of friction material.

In the FIG. 31-36 embodiment, each circulation channel 21 is oriented radially (i.e., is coaxial with, i.e., slopes at a zero angle with respect to, a respective radius); and each circulation channel 19 is also oriented radially (i.e., is coaxial with, i.e., slopes at a zero angle with respect to, a respective radius).

In the FIG. 37-45 embodiment, each circulation channel 21 slopes with respect to the radial, and forms an obtuse angle with the rotation direction. As stated, this orientation of circulation channels 21 enhances the turbine effect produced inside circulation channels 21, and so improves inward oil circulation along circulation channels 21. Each circulation channel 19 also slopes with respect to the radial, and forms an acute angle with the rotation direction. As stated, this orientation of circulation channels 19 enhances the centrifugal effect produced inside circulation channels 19, and so improves outward oil circulation along circulation channels 19.

In the FIG. 42-45 variation, circulation channels 19 and 21 are formed not only by removing covering 20 of friction material, but also by hollowing out part of corresponding disks 7 and 8 to form a larger flow section.

In the embodiments shown in the drawings, circulation channels 19 and 21 are straight (i.e., each circulation channel 19, 21 extends along a straight line); in a variation not shown, circulation channels 19 and 21 are curved (i.e., each circulation channel 19, 21 extends along a curved line).

Purely by way of example, FIGS. 1-45 show the design of disks 7 and 8 with reference to one oil-bath clutch 1, in which housing 4 is angularly integral with drive disks 7 (and therefore with drive shaft 2), and hub 6 is angularly integral with driven disks 8 (and therefore with driven shaft 3). In a variation, however, housing 4 may be angularly integral with driven disks 8 (and therefore with driven shaft 3), and hub 6 may be angularly integral with drive disks 7 (and therefore with drive shaft 2). Also purely by way of example, FIG. 1 shows drive shaft 2 on the opposite side of housing 4 to driven shaft 3. In a variation, however, drive shaft 2 may be located on the same side of housing 4 as driven shaft 3.

In FIGS. 1-45, the design of disks 7 and 8 is shown with reference to one oil-bath clutch 1, but (as shown in FIG. 46) also applies equally to a double multidisk oil-bath clutch 1, i.e., a clutch 1 interposed between a drive (or input) shaft 2 rotating at an angular speed $\omega_1$, and two driven (or output) shafts 3 independent of each other and rotating at respective angular speeds $\omega_2$. To power the two driven shafts 3, double clutch 1 comprises two independent packs of disks 7 and 8 in series: drive disks 7 in both packs are angularly integral with drive shaft 2, and driven disks 8 in both packs are angularly integral with respective drive shafts 3. FIG. 46 shows a few examples of double multidisk oil-bath clutches 1.

Figure 47:
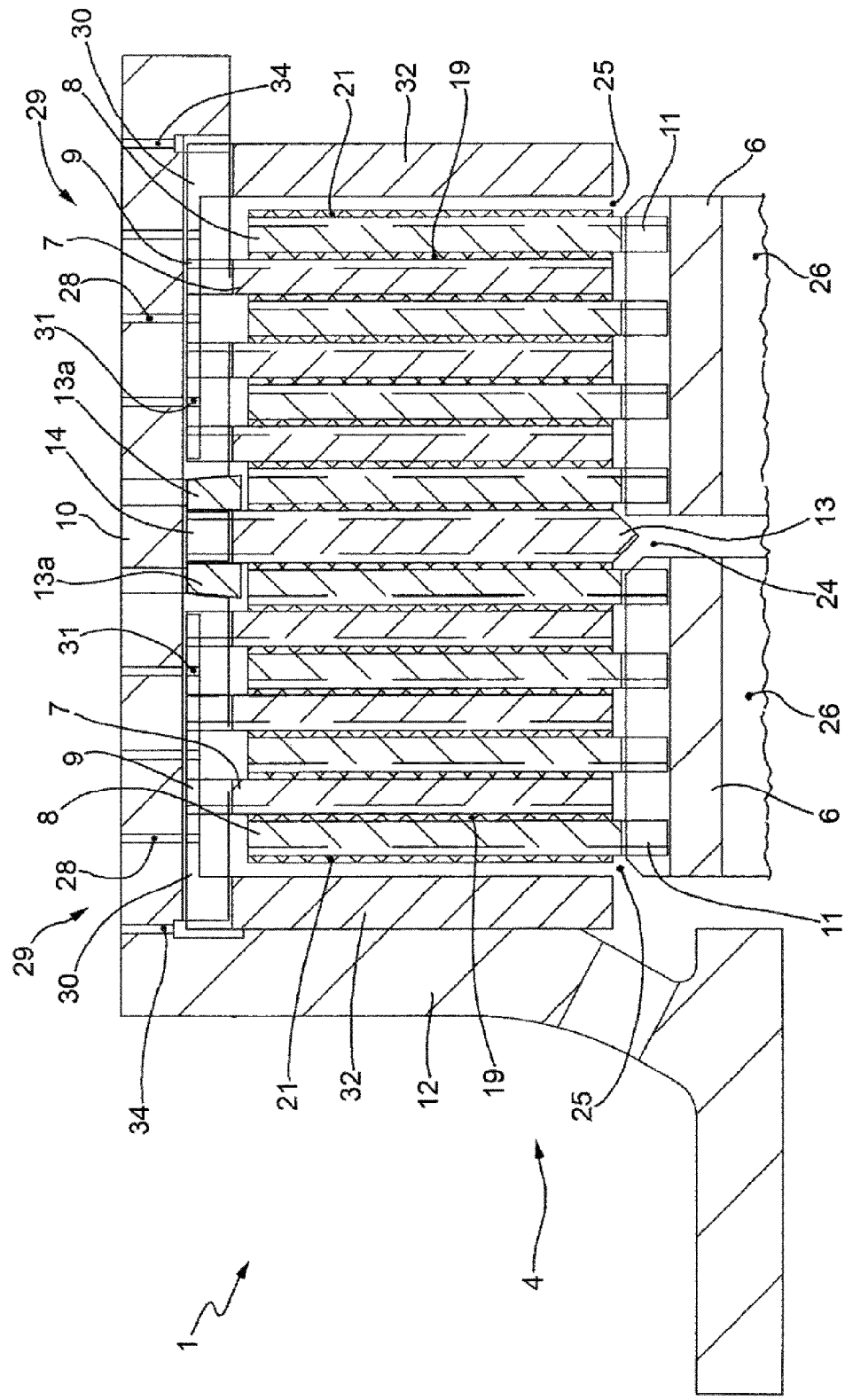
FIG. 47 shows a partial longitudinal section, with parts removed for clarity, of a double multidisk oil-bath clutch in accordance with an embodiment of the present invention.

By way of example, FIG. 47 shows a partial longitudinal section, with parts removed for clarity, of a double multidisk oil-bath clutch 1. FIG. 47 shows much the same as in FIG. 7, to which the reader is referred for a more detailed description, and shows two independent, side by side packs of disks 7 and 8, each of which has its own on-off valve 29 comprising a supporting disk 32 supporting corresponding shutters 30. The two supporting disks 32 are located on opposite sides of housing 4, i.e., on opposite sides of the two packs of disks 7 and 8. The two packs of disks 7 and 8 are separated by one central retaining disk 13, which is located centrally between the two packs of disks 7 and 8, and is made angularly integral with housing 4 by a number of external radial teeth which engage corresponding slots formed through lateral shell 10 of housing 4. Central retaining disk 13 is also locked to housing 4 by two retaining rings 13a, which expand inside cavities formed in shell 10 of housing 4. Retaining rings 13a may be rectangular or trapezoidal in cross section to wedge inside the cavities and take up any coupling slack, and are removed by pushing them from the outside, using punches, through holes in shell 10 of housing 4.

As shown in FIG. 47, clutch 1 has one main inlet 24 located centrally at central retaining disk 13, which also serves to divide the incoming oil flow; and two main outlets 25 on opposite sides of housing 4. The central position of main inlet 24 provides for distributing oil flow symmetrically into housing 4, and so preventing unbalanced cooling of the two packs of disks 7 and 8.

Figure 48:
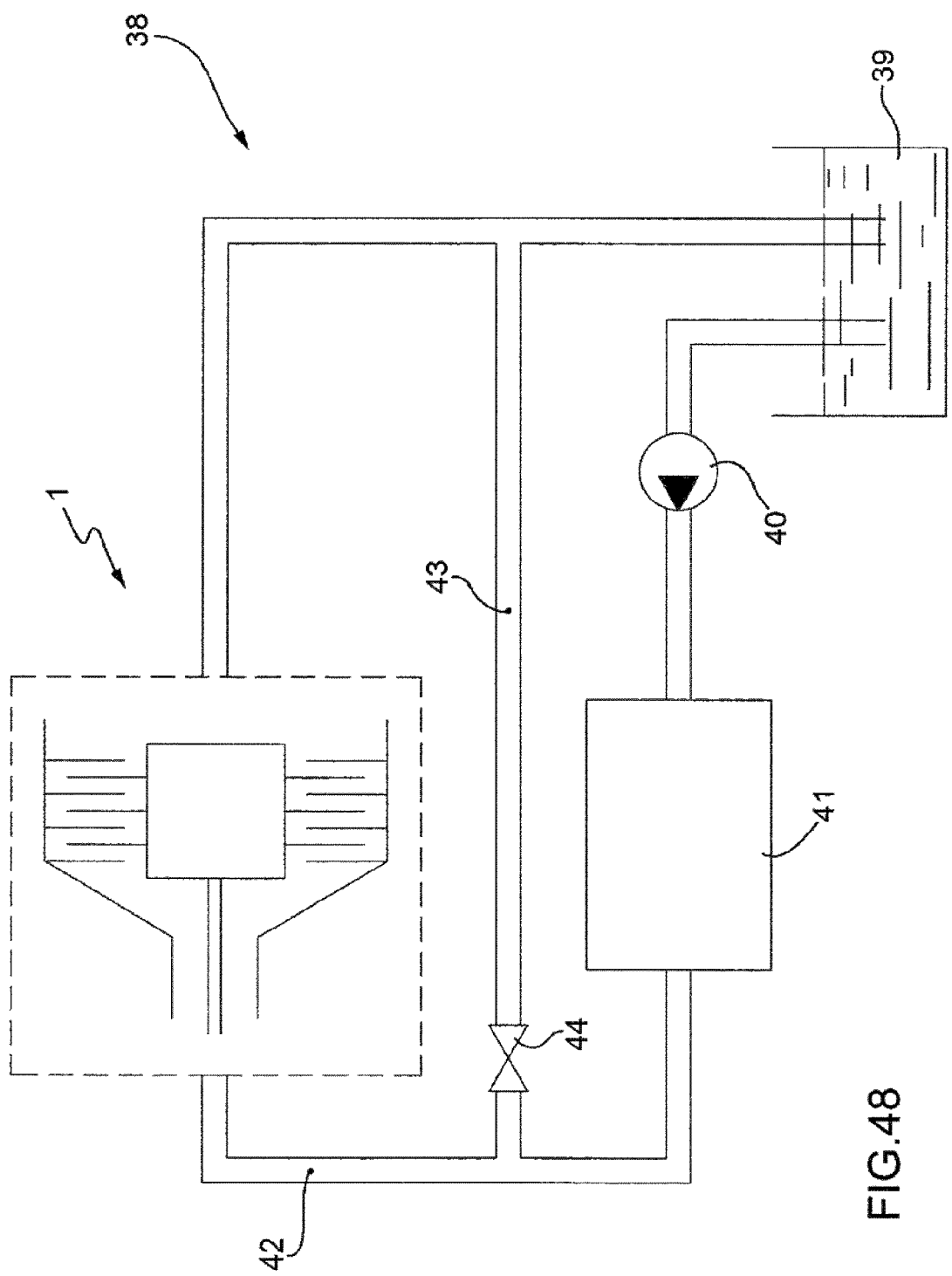
FIG. 48 shows schematically, with parts removed for clarity, an oil feed circuit of the FIG. 1 clutch.

As shown schematically in FIG. 48, oil-bath clutch 1 comprises a feed circuit 38 for feeding oil through housing 4, from inlet 24 to outlet 25. Feed circuit 38 comprises an oil tank 39; a circulating pump 40 that draws from tank 39; an oil-cooling radiator 41 in series with circulating pump 40; a main conduit 42 connecting the delivery of circulating pump 40 to inlet 24 of housing 4, and outlet 25 of housing 4 to oil tank 39; a bypass conduit 43 that branches off from main conduit 42 upstream from inlet 24 of housing 4, and terminates in oil tank 39; and a bypass valve 44 for regulating oil flow along bypass conduit 43.

In an embodiment, bypass valve 44 serves to open and close bypass conduit 43, leaving main conduit 42 open at all times. In actual use, bypass valve 44 is controlled to close bypass conduit 43 when clutch 1 is activated to transmit torque between drive disks 7 and driven disks 8, and to open bypass conduit 43 when clutch 1 is released and no torque is transmitted between drive disks 7 and driven disks 8. In other words, when disks 7 and 8 produce heat by friction and need cooling (i.e., when clutch 1 is activated to transmit torque between drive disks 7 and driven disks 8), bypass valve 44 is controlled to close bypass conduit 43, so that all the oil flows through housing 4. Conversely, when disks 7 and 8 produce no heat by friction and do not need cooling (i.e., when clutch 1 is released and no torque is transmitted between drive disks 7 and driven disks 8), bypass valve 44 is controlled to open bypass conduit 43, so that most of the oil flows along bypass conduit 43, as opposed to flowing through housing 4, to achieve maximum cooling of the oil by radiator 41. In this case too, because main conduit 42 remains open, a minimum amount of oil flows through housing 4 to adequately lubricate the rotating parts.

In an embodiment, to avoid the need for a separate, independent control for bypass valve 44, bypass valve 44 is controlled by the same control activating disk-pusher ring 16, so a movable shutter of bypass valve 44 is connected mechanically or hydraulically to a mechanical or hydraulic control activating disk-pusher ring 16.

Figure 49:
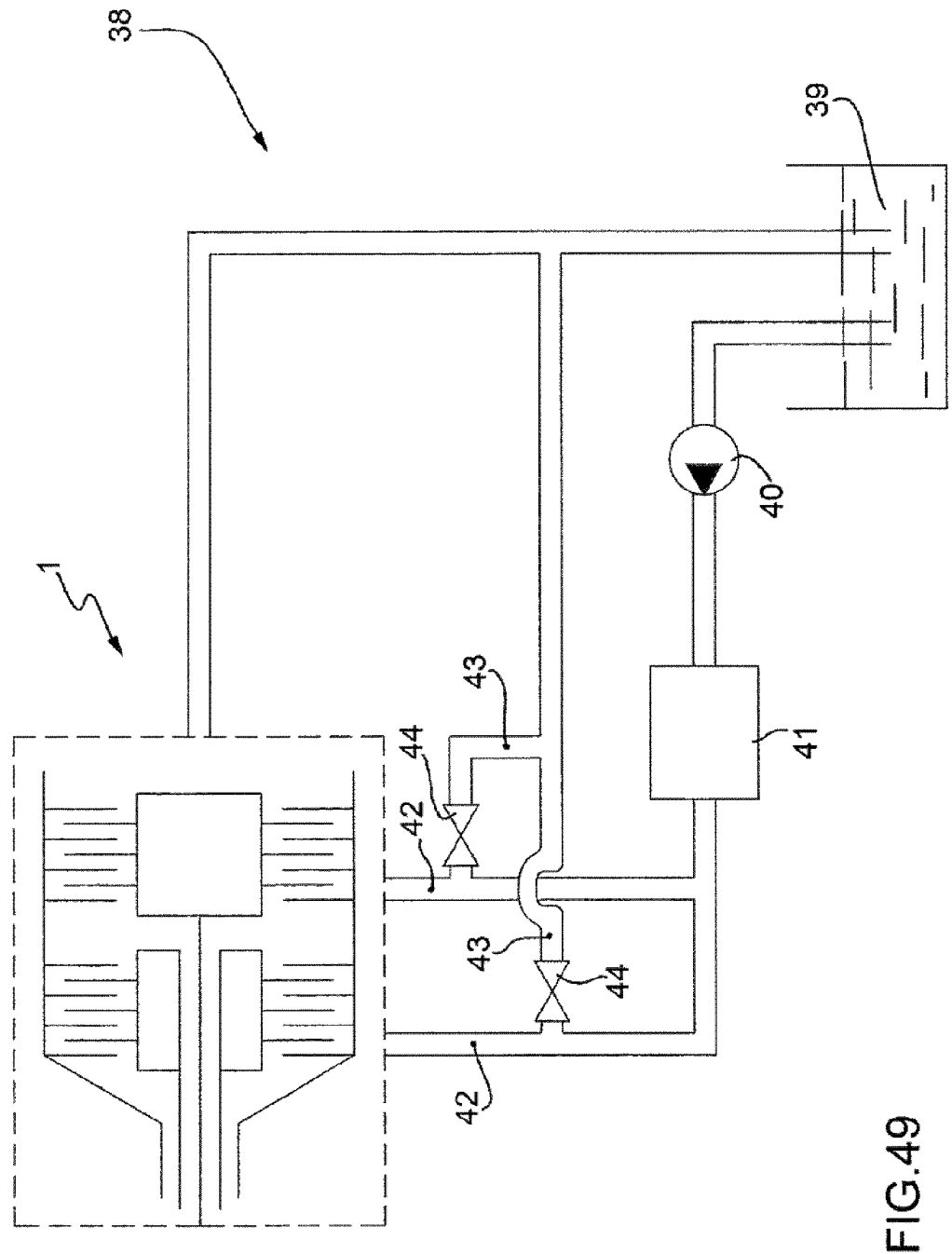
FIG. 49 shows schematically, with parts removed for clarity, a variation of the FIG. 46 oil feed circuit, adapted for a double multidisk oil-bath clutch.

FIG. 49 shows a variation of the FIG. 48 feed circuit 38 adapted for a double multidisk oil-bath clutch 1, i.e., a clutch 1 interposed between a drive (or input) shaft 2 rotating at an angular speed $\omega_1$, and two driven (or output) shafts 3 independent of each other and rotating at respective angular speeds $\omega_2$. To power the two driven shafts 3, clutch 1 comprises two independent packs of disks 7 and 8 in series: drive disks 7 in both packs are angularly integral with drive shaft 2, and driven disks 8 in both packs are angularly integral with respective drive shafts 3.

In the FIG. 49 variation, feed circuit 38 comprises two main conduits 42, each connecting a delivery of circulating pump 40 to two inlets 24 of housing 4 corresponding to respective packs of disks 7 and 8; two bypass conduits 43, each of which branches off from the corresponding main conduit 42 upstream from inlet 24 of housing 4, and terminates in oil tank 39; and two bypass valves 44, each for regulating oil flow along the corresponding bypass conduit 43.

Providing two bypass valves 44 enables oil supply to one of the two packs of disks 7 and 8, so that oil feed may be cut off (almost completely, as described above) from the unused pack of disks 7 and 8, and fed solely to the pack of disks 7 and 8 in use. Oil may also be fed to, or cut off (almost completely, as described above) from, both packs of disks 7 and 8.

The FIG. 48 feed circuit 38 may also be used with a double multidisk oil-bath clutch 1. In this case, a simpler feed circuit 38 is used, but oil feed may be cut off to only one pack of disks 7 and 8.

Oil-bath clutch 1 described above may have numerous advantages: it is relatively cheap and easy to produce, given the easy manufacture of circulation channels 19 and 21, and, above all, for a given oil flow, may provide for much more effective cooling than a similar conventional clutch. Moreover, the cooling capacity of oil-bath clutch 1 described is also intrinsically self-adaptive, and is regulated automatically as a function of slippage between drive disks 7 and driven disks 8.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A multidisk oil-bath clutch comprising:
a housing mounted to rotate about a longitudinal axis of rotation;
at least one hub mounted to rotate about the longitudinal axis of rotation and housed inside and coaxially with the housing;
a number of first disks housed inside the housing and angularly integral with one of the housing or the hub, wherein at least one lateral wall of each first disk has a covering of friction material;
a number of second disks housed inside the housing, alternating with the first disks, and angularly integral with the other one of the hub or the housing;
at least one oil inlet into the housing; and
at least one oil outlet from the housing;
wherein each first disk comprises a number of rectilinear first circulation channels, that are formed in the covering of friction material covering the lateral wall of the first disk, are equally spaced about the longitudinal axis of rotation, extend radially from an inner edge of the first disk to an outer edge of the first disk, and are completely separated and isolated one from the other; and
wherein each second disk comprises a number of rectilinear second circulation channels, that are equally spaced about the longitudinal axis of rotation, are formed in the second disk, and extend radially from axial inner openings formed through a lateral wall of the second disk, close to an inner edge of the second disk, to radial outer openings formed through an outer edge of the second disk so that each second circulation channel ends at a given distance from the inner edge of the second disk.

2. An oil-bath clutch as claimed in claim 1, wherein both the lateral walls of each first disk have a covering of friction material; and each first disk has first circulation channels on both the lateral walls covered with the covering of friction material.

3. A multidisk oil-bath clutch comprising:
a housing mounted to rotate about a longitudinal axis of rotation;
at least one hub mounted to rotate about the longitudinal axis of rotation and housed inside and coaxially with the housing;
a number of first disks housed inside the housing and angularly integral with one of the housing or the hub, wherein each first disk comprises a number of first circulation channels equally spaced about the longitudinal axis of rotation and extending radially from an inner edge of the first disk to an outer edge of the first disk;
a number of second disks housed inside the housing, alternating with the first disks, and angularly integral with the other one of the hub or the housing, wherein each second disk comprises a number of second circulation channels equally spaced about the longitudinal axis of rotation and extending radially from an inner portion of the second disk to an outer edge of the second disk;
at least one oil inlet into the housing;
at least one oil outlet from the housing; and
a feed circuit for feeding oil through the housing from the inlet to the outlet for feeding pressurized oil that serves to cool the disks and lubricate the rotating component parts, and which comprises: an oil tank; a circulating pump that draws from the tank; an oil-cooling radiator in series with the circulating pump; at least one main conduit which connects the delivery of the circulating pump to the inlet of the housing and is always open for always feeding, without any interruption, pressurized oil that serves to cool the disks and lubricate the rotating component parts; a bypass conduit which branches off from the main conduit, upstream from the inlet of the housing, and terminates in the oil tank; and a bypass valve for regulating oil flow along the bypass conduit while always leaving the main conduit open.

4. An oil-bath clutch as claimed in claim 3, wherein the bypass valve has the function of opening and closing the bypass conduit.

5. An oil-bath clutch as claimed in claim 3, wherein the bypass valve is controlled to close the bypass conduit when the clutch is activated to transmit torque between the first disks and the second disks, and to open the bypass conduit when the clutch is released and no torque is transmitted between the first disks and the second disks.

6. An oil-bath clutch as claimed in claim 5, and comprising a disk-pusher which is moved axially to press on the disks and so pack the disks together to transmit torque from the first disks to the second disks; the bypass valve being controlled by the same control activating the disk-pusher.

\* \* \* \* \*